USO12431055B2

(12) United States Patent
Zhai et al.

(10) Patent No.: US 12,431,055 B2
(45) Date of Patent: Sep. 30, 2025

(54) DISPLAY APPARATUS

(71) Applicant: Tianma Advanced Display Technology Institute (Xiamen) Co., Ltd., Xiamen (CN)

(72) Inventors: Yingteng Zhai, Xiamen (CN); Zhenyu Jia, Xiamen (CN); Feng Qin, Xiamen (CN)

(73) Assignee: Tianma Advanced Display Technology Institute (Xiamen) Co., Ltd., Xiamen (CN)

(*) Notice: Subject to any disclaimer, the term of this patent is extended or adjusted under 35 U.S.C. 154(b) by 1 day.

(21) Appl. No.: 18/470,573

(22) Filed: Sep. 20, 2023

(65) Prior Publication Data

US 2024/0005836 A1 Jan. 4, 2024

(30) Foreign Application Priority Data

Jun. 30, 2023 (CN) ......................... 202310796658.7

(51) Int. Cl.
*G09G 3/20* (2006.01)
*G09G 3/32* (2016.01)

(52) U.S. Cl.
CPC ............ *G09G 3/2081* (2013.01); *G09G 3/32* (2013.01); *G09G 2300/0426* (2013.01); *G09G 2310/0259* (2013.01); *G09G 2310/0286* (2013.01); *G09G 2310/066* (2013.01); *G09G 2320/0233* (2013.01); *G09G 2320/064* (2013.01)

(58) Field of Classification Search
CPC .. G09G 3/2014; G09G 3/2081; G09G 3/3233; G09G 3/32; G09G 2310/066; G09G 2320/064; G09G 2300/0426; G09G 2310/0286; G09G 2320/0233; G09G 2300/0842; G09G 2310/0259
See application file for complete search history.

(56) References Cited

U.S. PATENT DOCUMENTS

2018/0356668 A1* 12/2018 Koide ................. G02F 1/13338
2020/0312229 A1* 10/2020 Kim ......................... G09G 3/32
2021/0312856 A1* 10/2021 Jeong ....................... G09G 3/32
2022/0215796 A1* 7/2022 Zhai ......................... G09G 3/32

FOREIGN PATENT DOCUMENTS

CN 113287161 A 8/2021
CN 114241974 A 3/2022

* cited by examiner

*Primary Examiner* — Shaheda A Abdin
(74) *Attorney, Agent, or Firm* — CHRISTENSEN O'CONNOR JOHNSON KINDNESS PLLC

(57) ABSTRACT

A display apparatus includes a display panel and sweep signal lines. In an embodiment, the display panel includes light-emitting elements and pixel circuits. In an embodiment, at least one of the pixel circuits includes a pulse width modulation (PWM) module configured to control light emission duration of the light-emitting element. In an embodiment, the sweep signal lines are configured to provide a sweep signal to the PWM module. In an embodiment, the sweep signal lines include first sweep signal lines extending in a first direction, and at least two of the first sweep signal lines are connected through a first connection line extending in a second direction that intersects the first direction.

20 Claims, 17 Drawing Sheets

DISPLAY APPARATUS

CROSS-REFERENCE TO RELATED APPLICATIONS

The present application claims priority to Chinese Patent Application No. 202310796658.7, filed on Jun. 30, 2023, the content of which is incorporated herein by reference in its entirety.

TECHNICAL FIELD

The present disclosure relates to the field of display technologies, and in particular, to a display apparatus.

BACKGROUND

Conventionally, in a layout of sweep lines (i.e., lines configured to provide a sweep signal for a pulse width modulation (PWM) module) of a display screen, each sub-pixel row is correspondingly provided with a transverse sweep line. The display screen further includes multiple longitudinal sweep lines. A number of the longitudinal sweep lines is far smaller than a number of sub-pixel columns. Each longitudinal sweep line is electrically connected to all transverse sweep lines. However, positions of nodes at which each longitudinal sweep line is electrically connected to the transverse sweep lines correspond to only one sub-pixel column. Consequently, the nodes at which the longitudinal sweep line is electrically connected to the transverse sweep lines are not disposed at positions corresponding to other sub-pixel columns in the display screen. In addition, because each longitudinal sweep line is electrically connected to one lead-out pad, an electrical signal is transmitted on the longitudinal sweep line. Therefore, a position with the node at which the longitudinal sweep line is connected to the transverse sweep line and a position without the node at which the longitudinal sweep line is connected to the transverse sweep line are in different operating states, resulting in different signal waveforms on the sweep lines at different positions in the display screen and different display effects in different regions of the display screen.

SUMMARY

An aspect of the present disclosure provides a display apparatus. In an embodiment, the display apparatus includes a display panel and sweep signal lines. In an embodiment, the display panel includes light-emitting elements and pixel circuits. In an embodiment, at least one of the pixel circuits includes a pulse width modulation (PWM) module configured to control light emission duration of the light-emitting element. In an embodiment, the sweep signal lines are configured to provide a sweep signal to the PWM module. In an embodiment, the sweep signal lines include first sweep signal lines extending in a first direction, and at least two of the first sweep signal lines are connected through a first connection line extending in a second direction that intersects the first direction.

BRIEF DESCRIPTION OF DRAWINGS

The accompanying drawings, which are incorporated in and constitute a part of the specification, illustrate embodiments of the present disclosure and together with the general description, serve to explain the principles of the present disclosure.

DESCRIPTION OF EMBODIMENTS

Figure 1:
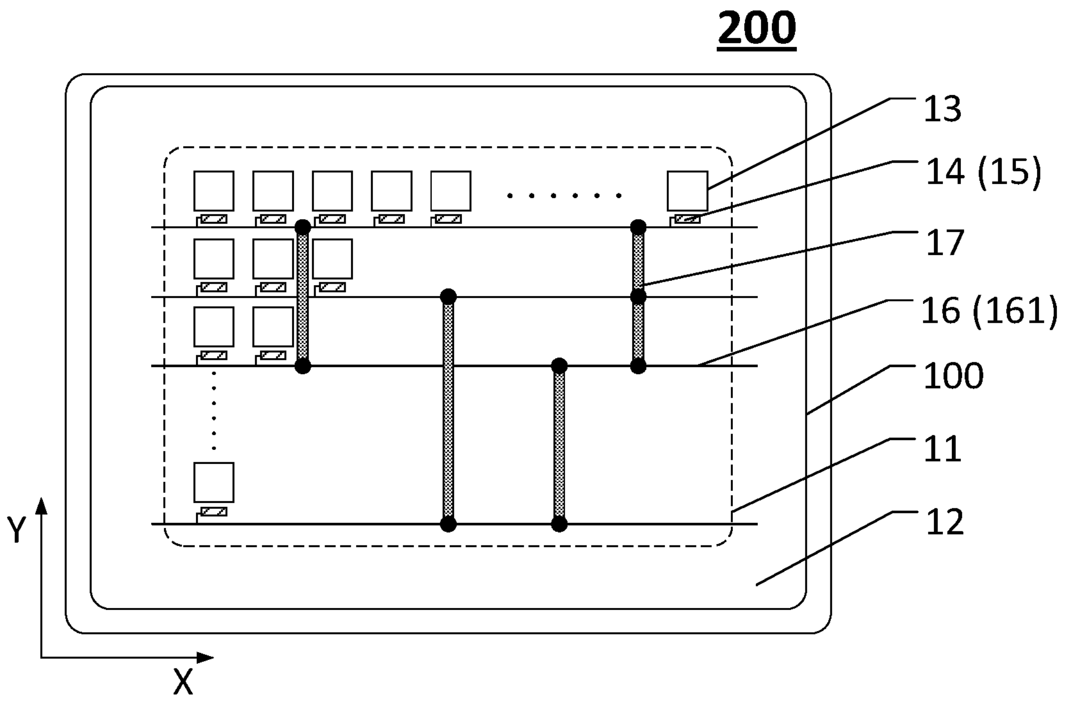
FIG. 1 is a schematic diagram of a display apparatus according to an embodiment of the present disclosure.

The exemplary embodiments of the present disclosure are described below with reference to the drawings. It should be noted that unless otherwise specified, the relative arrangement, numerical expressions, and numerical values of components and steps set forth in these embodiments do not limit the scope of the present disclosure.

The following description of at least one exemplary example is merely illustrative, and not intended to limit the present disclosure and application or use thereof in any way.

The technologies, methods, and devices known to those of ordinary skill in the art may not be discussed in detail, but where appropriate, the technologies, methods, and devices should be regarded as part of the specification.

In all examples shown and discussed herein, any specific value should be interpreted as merely exemplary, rather than restrictive. Therefore, other examples of the exemplary embodiments may have different values.

It should be noted that similar reference numerals and letters represent similar items in the accompanying drawings below. Therefore, once an item is defined in one accompanying drawing, it does not need to be further discussed in subsequent accompanying drawings.

Conventionally, not every sub-pixel column is correspondingly provided with a longitudinal sweep line. For a sub-pixel row, load of a position with a node at which a longitudinal sweep line is connected to a transverse sweep line is different from load of a position without the node at which the longitudinal sweep line is connected to the transverse sweep line. Load of a sub-pixel at the position with the node at which the longitudinal sweep line is connected is different from load of a sub-pixel at the position without the node at which the longitudinal sweep line is connected during operating. The load of the node position is smaller. This makes signals transmitted by the transverse sweep line and received by the sub-pixels in a node region and a non-node region uneven, resulting in different operating states, different signal waveforms on the sweep lines at different positions in a display, and different display effects in different regions of the display screen.

In view of this, the present disclosure provides a display apparatus to resolve a problem of different display effects in different regions of a display screen.

FIG. 1 is a schematic diagram of a display apparatus according to an embodiment of the present disclosure. Referring to FIG. 1, the present disclosure provides a display apparatus 200, including a display panel 100 and sweep signal lines 16.

The display panel 100 includes multiple light-emitting elements 13 and multiple pixel circuits 14.

The pixel circuit 14 includes a PWM module 15, and the PWM module 15 is configured to control light emission duration of the light-emitting element 13.

The sweep signal line 16 is configured to provide a sweep signal to the PWM module 15.

The sweep signal lines 16 include first sweep signal lines 161 extending in a first direction X. At least two of the first sweep signal lines 161 are connected through a first connection line 17. The first connection line 17 extends in a second direction Y The second direction Y intersects the first direction X.

The present disclosure provides the display apparatus 200. The display apparatus 200 includes the display panel 100. The display panel 100 includes a display region 11 and a non-display region 12 at least partially surrounding the display region 11. The display panel 100 is provided with multiple light-emitting elements 13 located in the display region 11 and the pixel circuits 14 electrically connected to the light-emitting elements 13. The pixel circuit 14 is configured to control the light-emitting element 13 electrically connected thereto to be in a light-emitting state or a non-light-emitting state. The pixel circuit 14 includes the PWM module 15 configured to control the light emission duration of the light-emitting element 13 electrically connected thereto. The pixel circuit 14 changes a voltage of a gate of a drive transistor in the pixel circuit 14 based on the received sweep signal so that a drive current having a pulse width corresponding to a specified PWM voltage can be provided to the light-emitting element 13 to control the light emission duration of the light-emitting element 13. The display apparatus 200 further includes the sweep signal lines 16 configured to provide the sweep signal to the PWM module 15. The sweep signal lines 16 in the display apparatus 200 may include at least the first sweep signal lines 161. The first sweep signal lines 161 extend in the first direction X and are arranged in the second direction Y. The first direction X may be a row direction in which the light-emitting elements 13 are arranged. The second direction Y may be a column direction in which the light-emitting elements 13 are arranged. The first direction X may be perpendicular to the second direction Y. The display apparatus 200 further includes the first connection line 17. The first connection line 17 extends in the second direction Y. The first connection line 17 is electrically connected to at least two of the first sweep signal lines 161.

According to a design requirement for the display apparatus 200, there may be multiple first sweep signal lines 161 in the display apparatus 200 to which multiple corresponding first connection lines 17 are electrically connected. A number of first sweep signal lines 161 to which each first connection line 17 is electrically connected may be the same or different. Positions of the first sweep signal lines 161 to which each first connection line 17 is electrically connected may also be adjusted as required, which is not limited in the present disclosure. A number and positions of the first connection lines 17 and numbers of first sweep signal lines 161 to which the first connection lines 17 are electrically connected are adjusted to increase a number of nodes at which the first connection lines 17 are electrically connected to the first sweep signal lines 161 in the display region 11, so that load of an electrical signal received by the light-emitting element 13 at a side away from the nodes at which the first connection lines 17 are electrically connected to the first sweep signal lines 161 is reduced. Meanwhile, a display difference between the light-emitting element 13 at the side away from the nodes at which the first connection lines 17 are electrically connected to the first sweep signal lines 161, and the light-emitting element 13 at a side close to the nodes at which the first connection lines 17 are electrically connected to the first sweep signal lines 161 is weakened, thereby improving the display effect of the display apparatus 200.

It should be noted that all sweep signal lines 16 may be disposed in a same film layer of the display panel 100 as required. All first connection lines 17 may be disposed in a same layer of the display panel 100 as required. In this case, the first connection lines 17 and the sweep signal lines 16 may be disposed in different film layers. However, the present disclosure is not limited thereto. At least one of the sweep signal lines 16 and at least one of the first connection lines 17 may be disposed in a same film layer as required. Alternatively, all of the first connection lines 17 and the sweep signal lines 16 in the display panel 100 may be disposed in three or more film layers as required.

It should be noted that the present disclosure does not limit that the first connection line 17 is connected to only 2 sweep signal lines 16. The first connection line 17 may be set to be connected to 3, 4, 15, 84, or another number of sweep signal lines 16 as required. The present disclosure also does not limit that the sweep signal lines 16 to which the first connection line 17 is electrically connected are arranged adjacent to each other, at regular intervals, or based on a specific rule. The sweep signal lines 16 to which the first connection line 17 is electrically connected may be selected as required.

Figure 2:
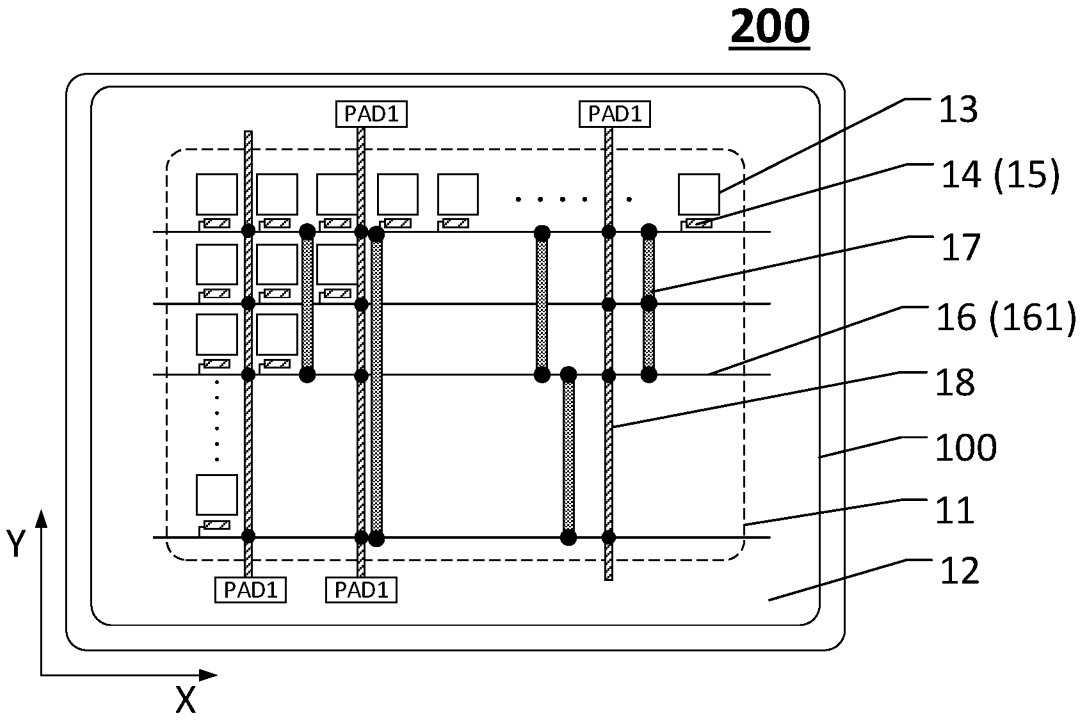
FIG. 2 is a schematic diagram of a display apparatus according to another embodiment of the present disclosure.

FIG. 2 is a schematic diagram of a display apparatus according to another embodiment of the present disclosure. Referring to FIG. 2, in some embodiments of the present disclosure, the display panel 100 includes an auxiliary line 18. The auxiliary line 18 extends in the second direction Y. The auxiliary line 18 is connected to at least two first sweep signal lines 161.

The first connection line 17 is connected to M first sweep signal lines 161. The auxiliary line 18 is connected to N first sweep signal lines 161. N≥2. N>M. M and N are both positive integers.

The present disclosure further provides an optional embodiment in which the display panel 100 is further provided with multiple auxiliary lines 18 extending in the second direction Y. The auxiliary line 18 is electrically connected to at least 2 first sweep signal lines 161. In some embodiments of the present disclosure, the auxiliary line 18 may be set to be electrically connected to 2, 8, 35, 180, or another number of first sweep signal lines 161 as required. The number of first sweep signal lines 161 to which the auxiliary line 18 is electrically connected may be set to be greater than the number of first sweep signal lines 161 to which the first connection line 17 is electrically connected.

In other words, for the first connection line 17 and the auxiliary line 18 extending in the second direction Y in the display apparatus 200, the auxiliary line 18 may be electrically connected to the first sweep signal lines 161 in all rows at most, and the first connection line 17 may be connected to the first sweep signal lines 161 in all rows minus 1 row at most. With such configuration, an extension length of the auxiliary line 18 in the second direction Y can easily exceed a length of the display region 11 in the second direction Y. Therefore, whether the auxiliary line 18 is electrically connected to another component in the non-display region 12 of the display apparatus 200 can be selected as required, so that an electrical signal is received as required, thereby improving diversified operating requirements for the display panel 100.

In addition, the auxiliary line 18 and the first connection line 17 are both electrically connected to the first sweep signal lines 161 so that a number of nodes electrically connected to the first sweep signal lines 161 can be increased. Numbers and positions of first connection lines 17 and auxiliary lines 18, and numbers of first sweep signal lines 161 to which the first connection lines 17 and the auxiliary lines 18 are electrically connected are adjusted to increase a number of nodes at which the first connection lines 17 and the auxiliary lines 18 are electrically connected to the first sweep signal lines 161 in the display region 11, so that a load of an electrical signal received by the light-emitting element 13 at a side away from the nodes at which the first connection lines 17 and the auxiliary lines 18 are electrically connected to the first sweep signal lines 161 is reduced. Meanwhile, a display difference between the light-emitting element 13 at the side away from the nodes at which the first connection lines 17 and the auxiliary lines 18 are electrically connected to the first sweep signal lines 161, and the light-emitting element 13 at a side close to the nodes at which the first connection lines 17 and the auxiliary lines 18 are electrically connected to the first sweep signal lines 161 is weakened, thereby improving the display effect of the display apparatus 200.

It should be noted that because the auxiliary lines 18 and the first connection lines 17 all extend in the second direction Y, all auxiliary lines 18 and all first connection lines 17 may be disposed in a same film layer as required, to avoid increasing a thickness of the display apparatus 200 by occupying two or more film layers, thereby achieving a design requirement of thinning the display apparatus 200. However, the present disclosure is not limited thereto. At least one of the auxiliary lines 18 and at least one of the first connection lines 17 may be disposed in a same film layer as required, or at least one of the auxiliary lines 18 and/or at least one of the first connection lines 17 may be disposed in different film layers as required.

Still referring to FIG. 2, in some embodiments of the present disclosure, in the second direction Y, an extension length of the auxiliary line 18 is greater than an extension length of the first connection line 17.

The present disclosure further provides an optional embodiment in which an extension length of at least one auxiliary line 18 is greater than an extension length of at least one first connection line 17. In some embodiments of the present disclosure, the extension length of any auxiliary line 18 may be selected to be greater than the extension length of any first connection line 17 as required. In the embodiment shown in FIG. 2, the auxiliary line 18 is electrically connected to all of the first sweep signal lines 161, and the first connection line 17 is electrically connected to only 2, 3, or another number of first sweep signal lines 161. With such configuration, the auxiliary line 18 can be selected whether to be electrically connected to another component in the non-display region 12 of the display apparatus 200 as required, so that an electrical signal is received as required, thereby improving diversified operating requirements for the display panel 100.

Still referring to FIG. 2, in some embodiments of the present disclosure, the display apparatus 200 further includes a pin bonding pad PAD1. The pin bonding pad PAD1 is configured to provide the sweep signal to the PWM module 15.

The auxiliary line 18 is connected to the pin bonding pad PAD1.

The auxiliary line 18 in the display apparatus 200 has a large extension length and can be electrically connected to a large number of sweep signal lines 16. Therefore, the present disclosure further provides an optional embodiment in which the pin bonding pad PAD1 is disposed in the non-display region 12 of the display apparatus 200. The pin bonding pad PAD1 is configured to transmit the sweep signal. Further, the sweep signal is transmitted to the PWM module 15 through the auxiliary line 18 and the sweep signal line 16 to which the auxiliary line 18 is electrically connected so that the light emission duration of the related light-emitting element 13 is controlled through the sweep signal transmitted by the pin bonding pad PAD1.

In some embodiments of the present disclosure, at least one auxiliary line 18 electrically connected to the pin bonding pad PAD1 may be set to be electrically connected to all of the sweep signal lines 16 in the display apparatus 200 so that the sweep signal transmitted by the pin bonding pad PAD1 can be transmitted to the light-emitting elements 13 in all rows in the display apparatus 200 through the auxiliary line 18 and the sweep signal lines 16, thereby controlling the light emission duration of all related light-emitting elements 13 in the display apparatus 200. In addition, the numbers of sweep signal lines 16 to which multiple auxiliary lines 18 are electrically connected may be set to be the same or different as required. At least one sweep signal line 16 in the sweep signal lines 16 to which at least two auxiliary lines 18 are electrically connected may be set to be the same as required. That is, the positions and number of the auxiliary lines 18 may be set as required, which is not limited in the present disclosure.

It should be noted that the number of sweep signal lines 16 to which the first connection line 17 is electrically connected is at least smaller than the number of sweep signal lines 16 to which the longest auxiliary line 18 is electrically connected. Therefore, the first connection line 17 may be set to be not electrically connected to a component other than the sweep signal lines 16, and is configured only to transmit electrical signals transmitted through the sweep signal lines 16 electrically connected thereto. The numbers and positions of the first connection lines 17 and the auxiliary lines 18 and the numbers of first sweep signal lines 161 to which the first connection lines 17 and the auxiliary lines 18 are electrically connected are adjusted to increase the number of nodes at which the first connection lines 17 and the auxiliary lines 18 are electrically connected to the first sweep signal lines 161 in the display region 11, so that the load of the electrical signal received by the light-emitting element 13 at the side away from the nodes at which the first connection lines 17 and the auxiliary lines 18 are electrically connected to the first sweep signal lines 161 is reduced. Meanwhile, the display difference between the light-emitting element 13 at the side away from the nodes at which the first connection lines 17 and the auxiliary lines 18 are electrically connected to the first sweep signal lines 161 and the light-emitting element 13 at the side close to the nodes at which the first connection lines 17 and the auxiliary lines 18 are electrically connected to the first sweep signal lines 161 is weakened, thereby improving the display effect of the display apparatus 200.

Still referring to FIG. 2, in some embodiments of the present disclosure, at least one auxiliary line 18 is connected to at least two pin bonding pads PAD1.

The auxiliary line 18 in the display apparatus 200 has a large extension length and can be electrically connected to a large number of sweep signal lines 16. Therefore, the present disclosure further provides an optional embodiment in which both ends of the auxiliary line 18 may be electrically connected to the pin bonding pads PAD1. With such configuration, sweep signals can be simultaneously transmitted to the auxiliary lines 18 electrically connected thereto through the two pin bonding pads PAD1. This can reduce time required to transmit the sweep signals and improve operating efficiency of the display apparatus 200. The sweep signal provided by each pin bonding pad PAD1 only needs to be transmitted to the middle of the auxiliary line 18. This halves load on the auxiliary line 18 compared with only one pad PAD1 electrically connected to the auxiliary line 18. When one pin bonding pad PAD1 electrically connected to the auxiliary line 18 is damaged, the other pin bonding pad PAD1 can be used to transmit the sweep signal to the auxiliary line 18. This helps prolong a service life of the display apparatus 200, reduce a damage rate of the display apparatus 200, and improve user experience.

Still referring to FIG. 2, in some embodiments of the present disclosure, the number of auxiliary lines 18 is smaller than or equal to the number of first connection lines 17.

The present disclosure further provides an optional embodiment in which the number of auxiliary lines 18 in the display apparatus 200 may be smaller than or equal to the number of first connection lines 17. The auxiliary line 18 in the display apparatus 200 has a large extension length and may be electrically connected to the pin bonding pad PAD1 to provide the sweep signal. The display apparatus 200 may be provided with at least one pin bonding pad PAD1 and one corresponding electrically connected auxiliary line 18. Therefore, a requirement for the auxiliary line 18 in the display apparatus 200 is not high. Nodes electrically connected to the sweep signal lines 16 in the display apparatus 200 can be balanced by disposing a large number of first connection lines 17. In addition, reducing the number of auxiliary lines 18 and a number of pin bonding pads PAD1 electrically connected thereto as much as possible can reduce space required to dispose the pin bonding pads PAD1 in the non-display region 12, so that an area of the non-display region 12 in the display apparatus 200 is reduced, thereby achieving design requirements of a narrow frame of the display apparatus 200.

Figure 3:
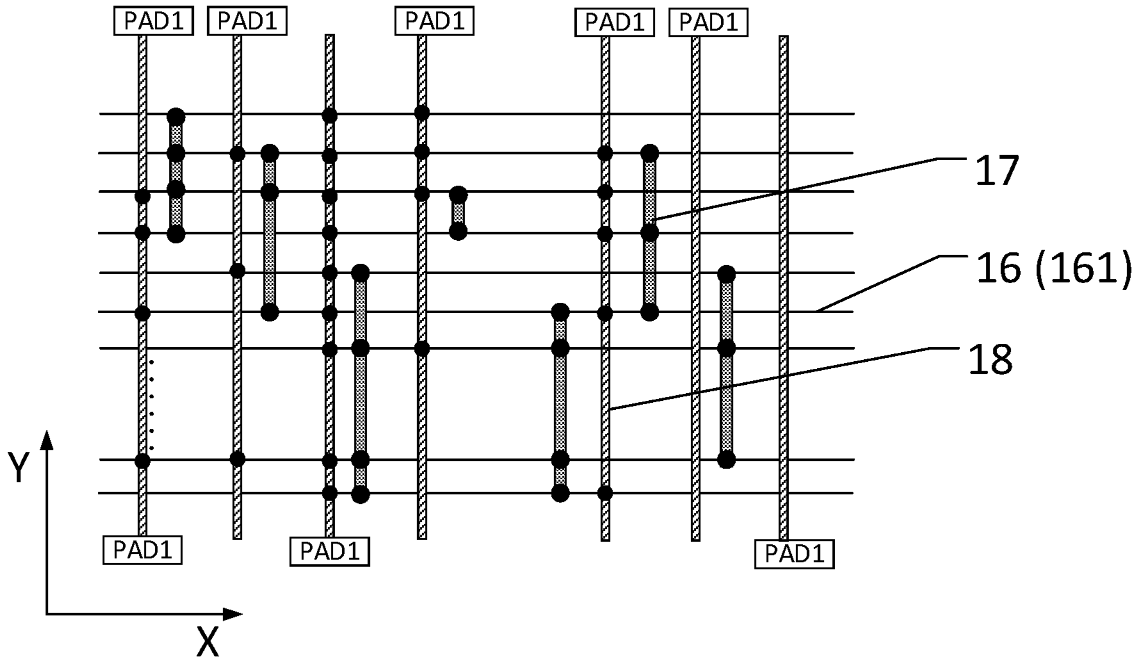
FIG. 3 is a schematic diagram of some components in a display apparatus according to an embodiment of the present disclosure.

FIG. 3 is a schematic diagram of some components in a display apparatus according to an embodiment of the present disclosure. Referring to FIG. 2 and FIG. 3, in some embodiments of the present disclosure, in the first direction X, at least one first connection line 17 is included between adjacent two of the auxiliary lines 18, and/or at least one auxiliary line 18 is included between adjacent two of the first connection lines 17.

The display apparatus 200 includes the auxiliary lines 18 and the first connection lines 17 extending in the second direction Y. Therefore, the present disclosure further provides an optional embodiment in which in the first direction X, one or more first connection lines 17 may be included between adjacent two of the auxiliary lines 18, and/or one or more auxiliary lines 18 may be included between adjacent two of the first connection lines 17. Further, as shown in FIG. 3, the auxiliary lines 18 and the first connection lines 17 may be alternately arranged in the first direction X.

When the display apparatus 200 includes at least 2 first connection lines 17 and at least 2 auxiliary lines 18, a manner in which the first connection lines 17 and the auxiliary lines 18 are arranged in the first direction X may be selected as required, provided that the sweep signal can be transmitted through the auxiliary lines 18. The nodes at which the first connection lines 17 and the auxiliary lines 18 are electrically connected to the sweep signal lines 16 are arranged as uniformly as possible in the display apparatus 200, so that the load of the electrical signal received by the light-emitting element 13 at the side away from the nodes at which the first connection lines 17 and the auxiliary lines 18 are electrically connected to the first sweep signal lines 161 is reduced, and the display difference between the light-emitting element 13 at the side away from the nodes at which the first connection lines 17 and the auxiliary lines 18 are electrically connected to the first sweep signal lines 161 and the light-emitting element 13 at the side close to the nodes at which the first connection lines 17 and the auxiliary lines 18 are electrically connected to the first sweep signal lines 161 is weakened, thereby improving the display effect of the display apparatus 200.

Figure 4:
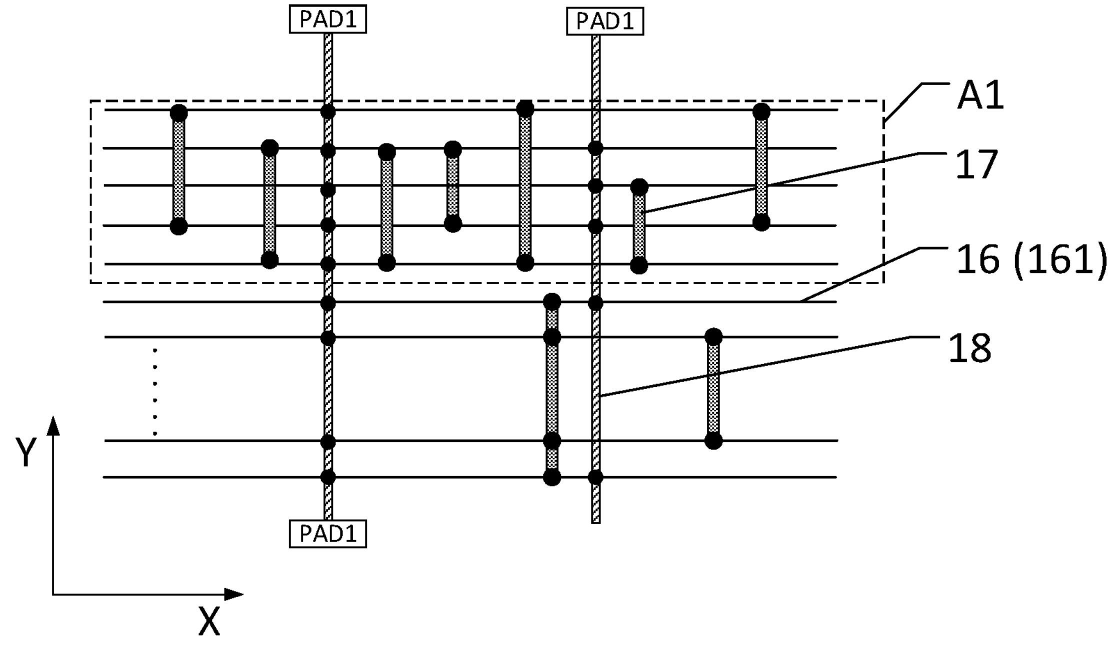
FIG. 4 is a schematic diagram of some components in a display apparatus according to another embodiment of the present disclosure.

FIG. 4 is a schematic diagram of some components in a display apparatus according to another embodiment of the present disclosure. Referring to FIG. 2 to FIG. 4, in some embodiments of the present disclosure, the display panel 100 includes a first display region A1. The first display region A1 includes n1 first sweep signal lines 161, where $n1 \geq 2$, and n1 is a positive integer. The first connection line 17 is connected to the a11$^{th}$ first sweep signal line 161 and the a12$^{th}$ first sweep signal line 161, where a12−a11≥2.

The present disclosure further provides an optional embodiment in which the display panel 100 includes the first display region A1. The first display region A1 may include at least 2 first sweep signal lines 161. In the embodiment shown in FIG. 4, at least one first connection line 17 may be electrically connected to any 2 first sweep signal lines 161 in the first display region A1. In addition, at least one first connection line 17 may be set to be electrically connected to multiple first sweep signal lines 161 in the first display region A1. In some embodiments of the present disclosure, when the first display region A1 includes 10 first sweep signal lines 161, there may be one first connection line 17 electrically connected to the 3$^{rd}$ first sweep signal line 161 and the 5$^{th}$ first sweep signal line 161, one first connection line 17 electrically connected to the 2$^{nd}$ first sweep signal line 161, the 3$^{rd}$ first sweep signal line 161, and the 7$^{th}$ first sweep signal line 161, and/or one first connection line 17 electrically connected to the 1$^{st}$ first sweep signal line 161, the 2$^{nd}$ first sweep signal line 161, the 3$^{rd}$ first sweep signal line 161, and the 6$^{th}$ first sweep signal line 161. The first sweep signal lines 161 to which the first connection line 17 is electrically connected in the first display region A1 can be selected as required. This improves diversity of line arrangements in the display apparatus 200 and facilitates adjustments to positions of electrical connections between the first connection line 17 and the sweep signal lines 16, a number of the electrical connections, and the like in the display apparatus 200 as required, thereby improving display uniformity of the display apparatus 200.

Figure 5:
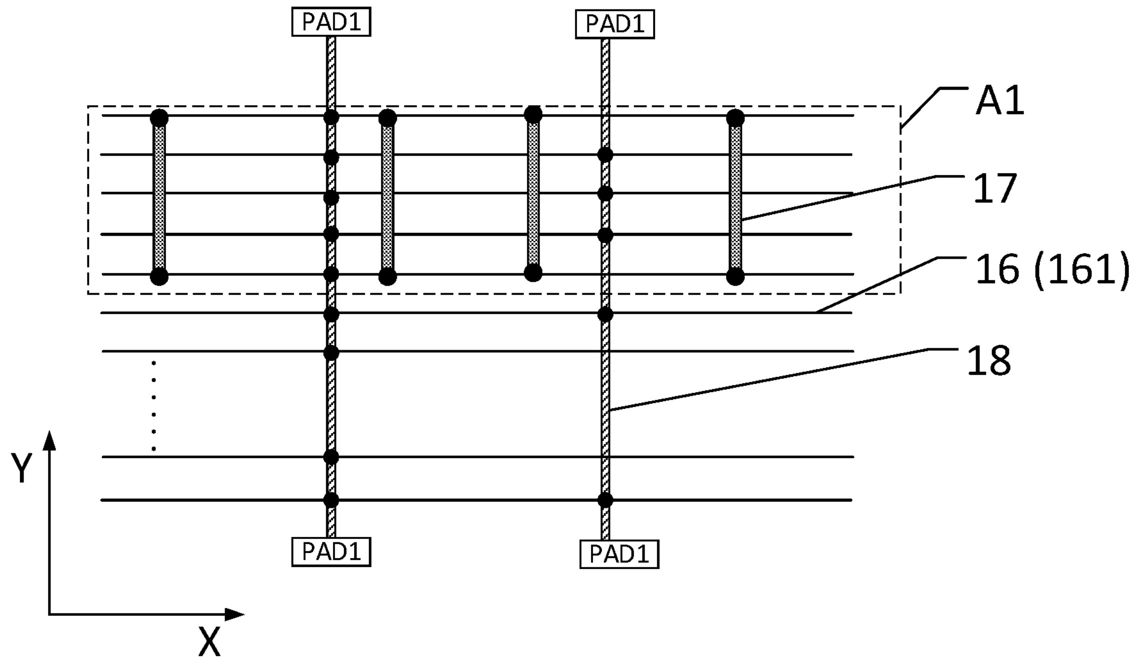
FIG. 5 is a schematic diagram of some components in a display apparatus according to another embodiment of the present disclosure.

FIG. 5 is a schematic diagram of some components in a display apparatus according to another embodiment of the present disclosure. Referring to FIG. 5 in combination with FIG. 2, in some embodiments of the present disclosure, the display panel 100 includes a first display region A1. The first display region A1 includes n1 first sweep signal lines 161. n1≥2. n1 is a positive integer. The first connection line 17 is connected to the 1$^{st}$ first sweep signal line 161 and the n1$^{th}$ first sweep signal line 161.

The present disclosure further provides an optional embodiment in which the display panel 100 includes the first display region A1. The first display region A1 may include at least 2 first sweep signal lines 161. At least one first connection line 17 may be electrically connected to the first sweep signal line 161 in the first row and the first sweep signal line 161 in the last row in the first display region A1. The present disclosure does not limit that the first connection line 17 in the first display region A1 can be electrically connected to only the first sweep signal line 161 in the first row and the first sweep signal line 161 in the last row. Therefore, the first sweep signal lines 161 to which the first connection line 17 is electrically connected in the first display region A1 can be selected as required, provided that positions of electrical connections between the first connection line 17 and the sweep signal lines 16, a number of the electrical connections, and the like in the display apparatus 200 can be adjusted to improve display uniformity of the display apparatus 200.

Figure 6:
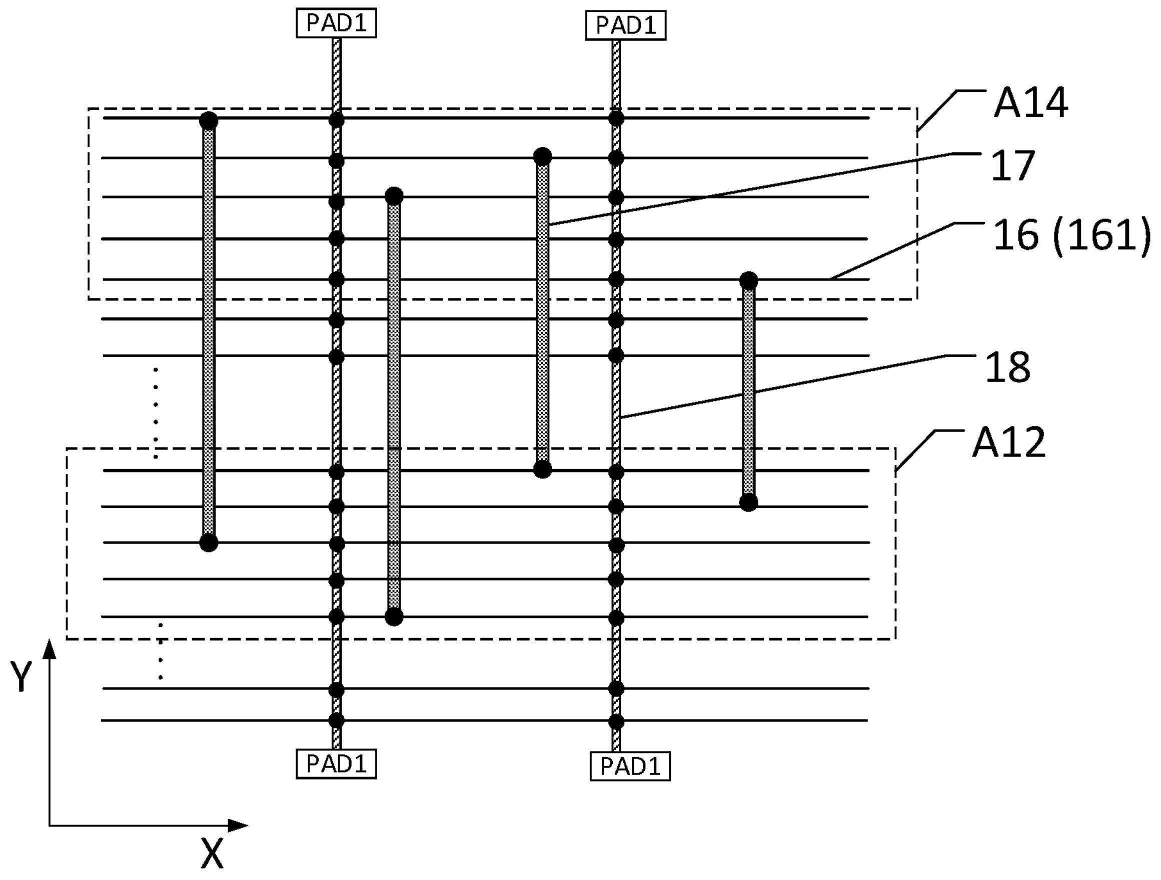
FIG. 6 is a schematic diagram of some components in a display apparatus according to another embodiment of the present disclosure.

FIG. 6 is a schematic diagram of some components in a display apparatus according to another embodiment of the present disclosure. Referring to FIG. 6 in combination with FIG. 2, in some embodiments of the present disclosure, the display panel 100 includes a first display sub-region A14 and a second display sub-region A12 spaced apart in the second direction Y. The first display sub-region A14 includes n1 first sweep signal lines 161. The second display sub-region A12 includes n2 first sweep signal lines 161. n1 and n2 are both positive integers.

The first connection line 17 is connected to one of the first sweep signal lines 161 in the first display sub-region A14 and one of the first sweep signal lines 161 in the second display sub-region A12.

The display panel 100 includes the first display sub-region A14 and the second display sub-region A12 spaced apart in the second direction Y. In other words, another display region 11 is further included between the first display sub-region A14 and the second display sub-region A12. On this basis, the present disclosure further provides an optional embodiment in which one first connection line 17 may be disposed to be connected to any one of the first sweep signal lines 161 in the first display sub-region A14 and any one of the first sweep signal lines 161 in the second display sub-region A12 as required. The present disclosure does not limit the first sweep signal lines 161 to which the first connection line 17 is connected, provided that positions of electrical connections between the first connection line 17 and the sweep signal lines 16, a number of the electrical connections, and the like in the display apparatus 200 can be adjusted to improve display uniformity of the display apparatus 200.

Figure 7:
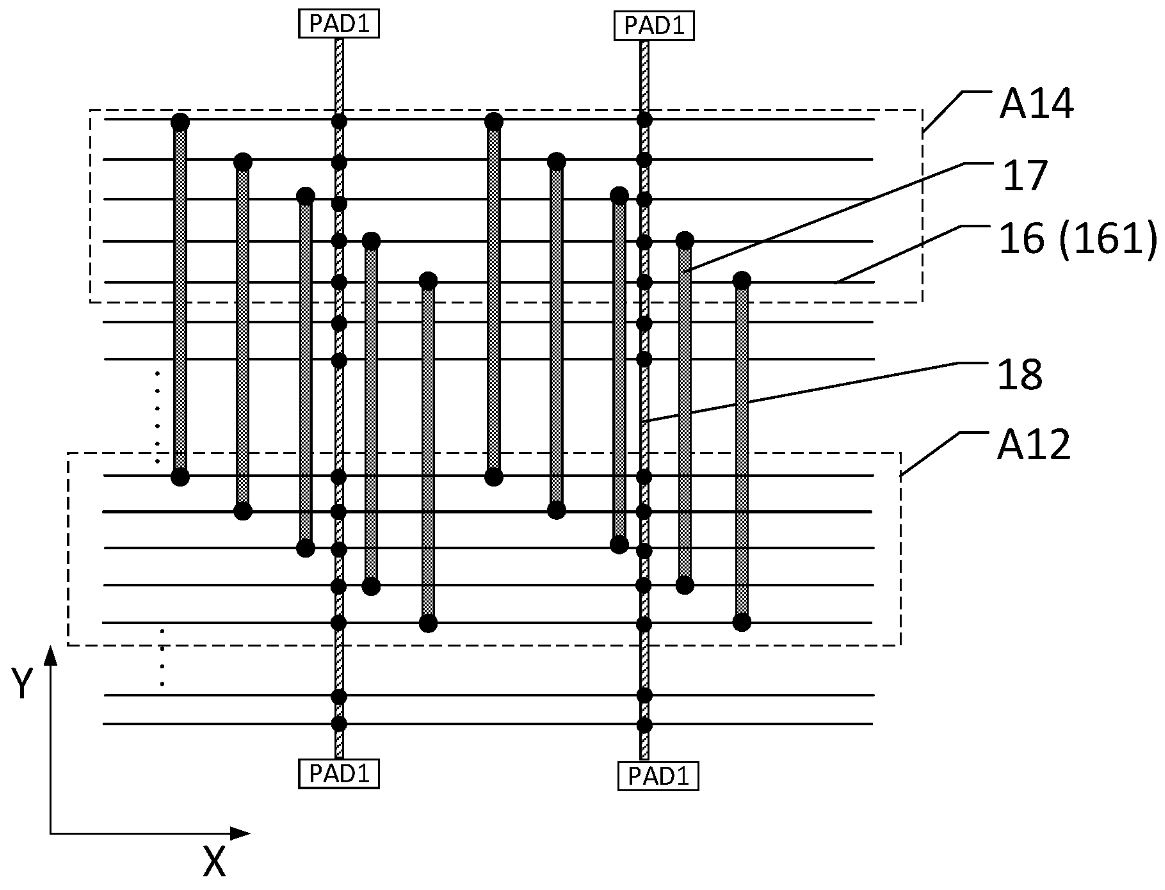
FIG. 7 is a schematic diagram of some components in a display apparatus according to another embodiment of the present disclosure.
Figure 8:
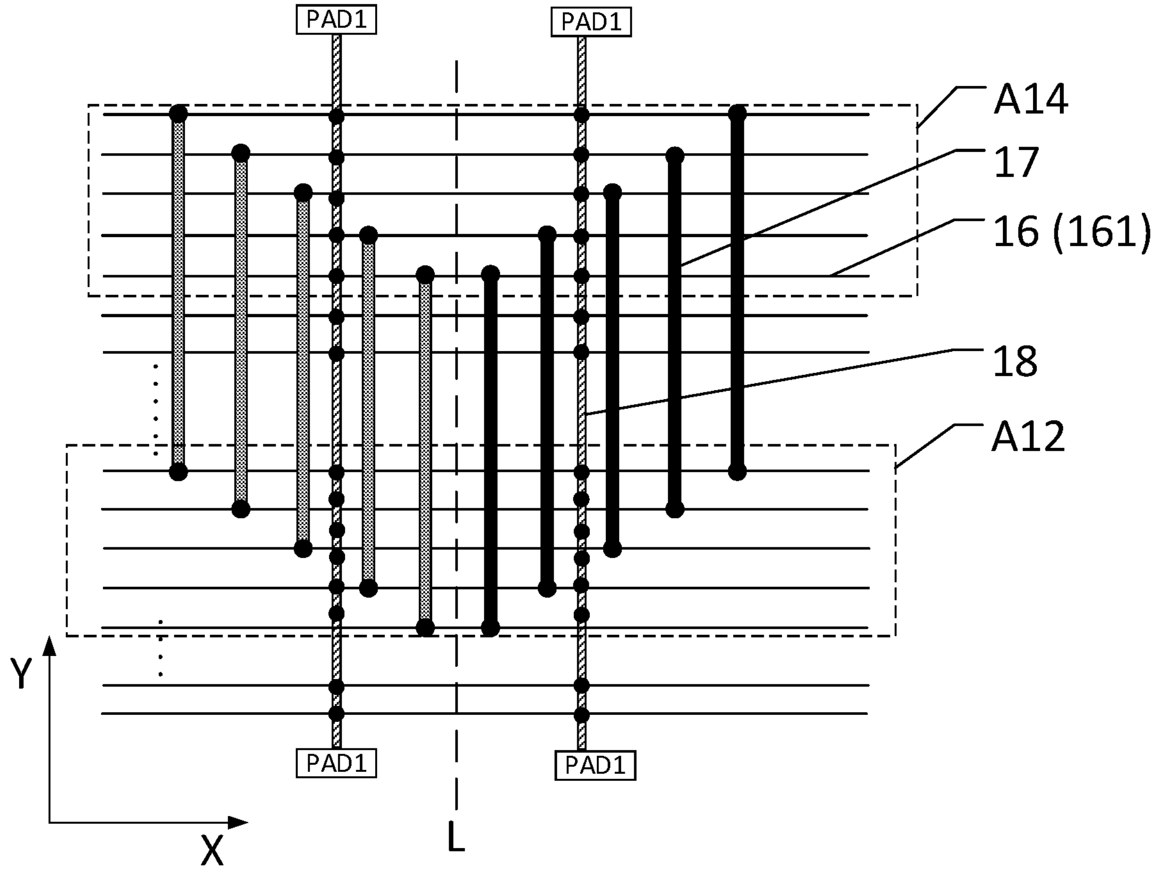
FIG. 8 is a schematic diagram of some components in a display apparatus according to another embodiment of the present disclosure.

FIG. 7 is a schematic diagram of some components in a display apparatus according to another embodiment of the present disclosure. FIG. 8 is a schematic diagram of some components in a display apparatus according to another embodiment of the present disclosure. Referring to FIG. 7 and FIG. 8 in combination with FIG. 2, in some embodiments of the present disclosure, n1≥2, n2≥2, and n1=n2.

The first connection line 17 is connected to the i$^{th}$ first sweep signal line 161 in the first display sub-region A14 and the i$^{th}$ first sweep signal line 161 in the second display sub-region A12, where i≤n1, and i is a positive integer.

The present disclosure further provides an optional embodiment on the basis that the display panel 100 includes the first display sub-region A14 and the second display sub-region A12 spaced apart and the first connection line 17 is connected to one of the first sweep signal lines 161 in the first display sub-region A14 and one of the first sweep signal lines 161 in the second display sub-region A12. As shown in FIG. 7, the number of the first sweep signal lines 161 in the first display sub-region A14 and that in the second display sub-region A12 may be further set to be the same. In this case, the first connection line 17 may be further set to have one end connected to the first sweep signal line 161 with a specific sequence number in the first display sub-region A14 and the other end connected to the first sweep signal line 161 with the sequence number in the second display sub-region A12. In some embodiments of the present disclosure, the first connection line 17 has one end connected to the 2$^{nd}$ first sweep signal line 161 in the first display sub-region A14 and the other end connected to the 2$^{nd}$ first sweep signal line 161 in the second display sub-region A12. Alternatively, the first connection line 17 has one end connected to the 5$^{th}$ first sweep signal line 161 in the first display sub-region A14 and the other end connected to the 5$^{th}$ first sweep signal line 161 in the second display sub-region A12. In addition, when the number of first connection lines 17 in the first display sub-region A14 is greater than n1, at least 2 groups of n1 first connection lines 17 may be alternately arranged in the first direction X. As shown in FIG. 8, at least 2 adjacent groups in at least 2 groups of n1 first connection lines 17 alternately arranged in the first direction X may also be symmetrically arranged. A symmetry axis L extends in the second direction Y.

It should be noted that the present disclosure does not require the number of first connection lines 17 in the first display sub-region A14 to be the same as the number of the first sweep signal lines 161. In other words, the present disclosure does not limit the number of first connection lines 17 disposed in the first direction X. The number of first connection lines 17 electrically connected to the first sweep signal lines 161 in the first display sub-region A14 can be set as required, provided that positions of electrical connections between the first connection line 17 and the sweep signal lines 16, a number of the electrical connections, and the like in the display apparatus 200 can be adjusted to improve display uniformity of the display apparatus 200.

It should be noted that when the first connection lines 17 electrically connected to the first sweep signal lines 161 in the first display sub-region A14 are disposed in such a manner and the first sweep signal lines 161 are arranged at equal intervals in the second direction Y, the first connection lines 17 may optionally have a same length in the second direction Y. It should be noted that the present disclosure does not limit that at least two first connection lines 17 disposed in the display apparatus 200 need to have a same length. Lengths of the first connection lines 17 disposed in the display apparatus 200 can be selected as required.

Figure 9:
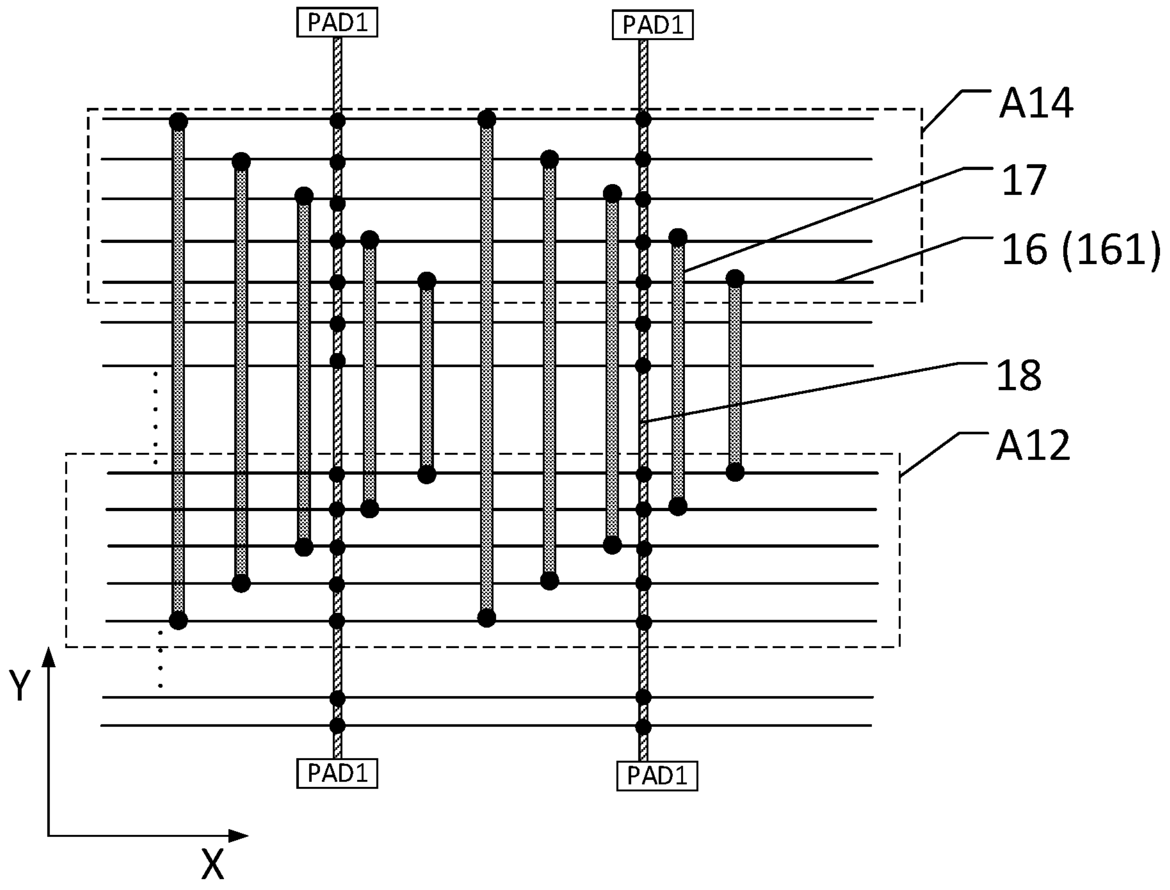
FIG. 9 is a schematic diagram of some components in a display apparatus according to another embodiment of the present disclosure.

FIG. 9 is a schematic diagram of some components in a display apparatus according to another embodiment of the present disclosure. Referring to FIG. 9 in combination with FIG. 2, in some embodiments of the present disclosure, $n1 \geq 2$, $n2 \geq 2$, and $n1 = n2$.

The first connection line 17 is connected to the $(1+b)^{th}$ first sweep signal line 161 in the first display sub-region A14 and the $(n2-b)^{th}$ first sweep signal line 161 in the second display sub-region A12, where, $b < n2$, $b \geq 0$, and b is an integer.

The present disclosure further provides an optional embodiment on the basis that the display panel 100 includes the first display sub-region A14 and the second display sub-region A12 spaced apart and the first connection line 17 is connected to one of the first sweep signal lines 161 in the first display sub-region A14 and one of the first sweep signal lines 161 in the second display sub-region A12. The number of the first sweep signal lines 161 in the first display sub-region A14 and that in the second display sub-region A12 may be further set to be the same. In this case, the first connection line 17 may be further set to be connected to the $(1+b)^{th}$ first sweep signal line 161 in the first display sub-region A14 and the $(n2-b)^{th}$ first sweep signal line 161 in the second display sub-region A12. In some embodiments of the present disclosure, as shown in FIG. 9, the first connection line 17 has one end connected to the $1^{st}$ first sweep signal line 161 in the first display sub-region A14 and the other end connected to the $n2^{th}$ ($5^{th}$) sweep signal line 161 in the second display sub-region A12. Alternatively, the first connection line 17 has one end connected to the 3rd first sweep signal line 161 in the first display sub-region A14 and the other end connected to the $(n2-2)^{th}$ ($3^{nd}$) first sweep signal line 161 in the second display sub-region A12. In addition, for example, the first connection line 17 alternatively has one end connected to the $10^{th}$ first sweep signal line 161 in the first display sub-region A14 and the other end connected to the $(n2-9)^{th}$ first sweep signal line 161 in the second display sub-region A12. With such configuration, to some extent, the first connection line 17 can have one end connected to the first sweep signal line 161 with a large voltage drop in the first display sub-region A14 and the other end connected to the first sweep signal line 161 with a small voltage drop in the second display sub-region A12, to balance the voltage drops of the first sweep signal lines 161 to which the first connection line 17 is electrically connected in the first display sub-region A14 and the second display sub-region A12. In addition, the number of first connection lines 17 electrically connected to the first sweep signal lines 161 in the first display sub-region A14 and positions of electrical connection nodes can be further selected and set as required, thereby further reducing a load difference between the regions of the display apparatus 200 and further improving the display uniformity of the display apparatus 200.

It should be noted that when the first connection lines 17 electrically connected to the first sweep signal lines 161 in the first display sub-region A14 are disposed in such a manner and the first sweep signal lines 161 are arranged at equal intervals in the second direction Y, at least two first connection lines 17 may have a same length in the second direction Y, or at least two first connection lines 17 may have different lengths in the second direction Y. In other words, the length of the first connection line 17 disposed in the display apparatus 200 is not limited in the present disclosure. The length of the first connection line 17 disposed in the display apparatus 200 can be selected as required.

Figure 10:
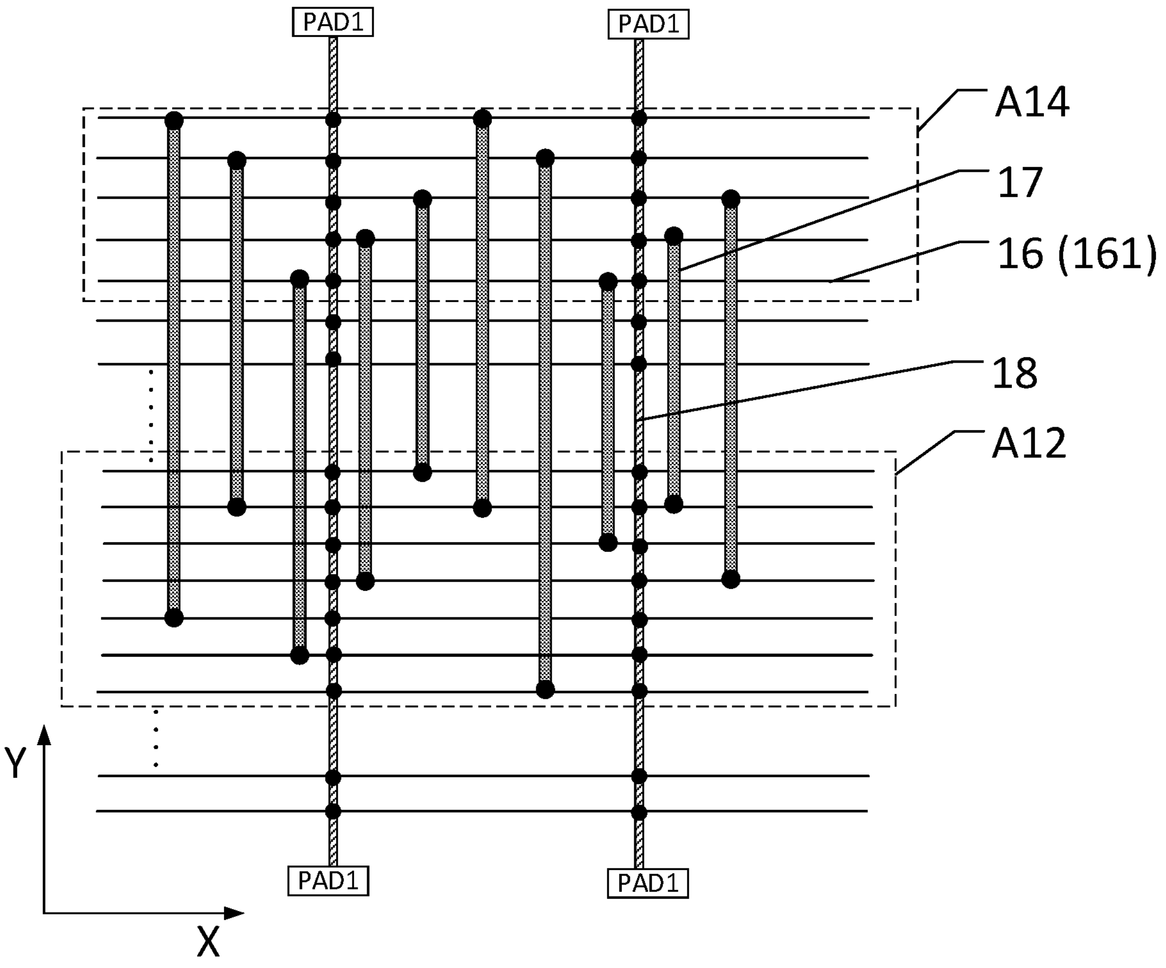
FIG. 10 is a schematic diagram of some components in a display apparatus according to another embodiment of the present disclosure.

FIG. 10 is a schematic diagram of some components in a display apparatus according to another embodiment of the present disclosure. Referring to FIG. 10 in combination with FIG. 2, in some embodiments of the present disclosure, $n1 \geq 2$, $n2 \geq 2$, and $n1 \neq n2$.

The first connection line 17 is connected to the $i1^{th}$ first sweep signal line 161 in the first display sub-region A14 and the $i2^{th}$ first sweep signal line 161 in the second display sub-region A12, where, $i1 \leq n1$, $i2 \leq n2$, and i1 and i2 are both positive integers.

The present disclosure further provides an optional embodiment on the basis that the display panel 100 includes the first display sub-region A14 and the second display sub-region A12 spaced apart and the first connection line 17 is connected to one of the first sweep signal lines 161 in the first display sub-region A14 and one of the first sweep signal lines 161 in the second display sub-region A12. The number of the first sweep signal lines 161 in the first display sub-region A14 and that in the second display sub-region A12 may be further set to be different. In this case, the first connection line 17 can be electrically connected to any one of the first sweep signal lines 161 in each of the first display sub-region A14 and the second display sub-region A12 as required. The present disclosure does not limit the first sweep signal lines 161 to which the first connection line 17 is connected, provided that positions of electrical connections between the first connection line 17 and the sweep signal lines 16, a number of the electrical connections, and the like in the display apparatus 200 can be adjusted to improve display uniformity of the display apparatus 200.

It should be noted that when the first connection lines 17 electrically connected to the first sweep signal lines 161 in the first display sub-region A14 are disposed in such a manner and the first sweep signal lines 161 are arranged at equal intervals in the second direction Y, at least two first connection lines 17 may have a same length in the second direction Y, or at least two first connection lines 17 may have different lengths in the second direction Y. In other words, the length of the first connection line 17 disposed in the display apparatus 200 is not limited in the present disclosure. The length of the first connection line 17 disposed in the display apparatus 200 can be selected as required.

Referring to FIG. 6 to FIG. 10 in combination with FIG. 2, in some embodiments of the present disclosure, the sweep signal includes a first sweep sub-signal.

The first sweep signal line 161 in the first display sub-region A14 receives the first sweep sub-signal.

The present disclosure further provides an optional embodiment on the basis that the display panel 100 includes the first display sub-region A14 and the second display sub-region A12 spaced apart and the first connection line 17 is connected to one of the first sweep signal lines 161 in the first display sub-region A14 and one of the first sweep signal lines 161 in the second display sub-region A12. It may be further set that the first sweep signal line in the first display sub-region A14 receives the first sweep sub-signal included in the sweep signal. When the first sweep signal line 161 in the second display sub-region A12 is electrically connected to the first sweep signal line 161 in the first display sub-region A14 through the first connection line 17, the first sweep signal lines 161 in the first display sub-region A14 and the second display sub-region A12 receive the first sweep sub-signal included in the sweep signal. Types of sweep signals received by the first sweep signal lines 161 disposed in the first display sub-region A14 and the second display sub-region A12 can be the same through this arrangement manner. In this case, if the first sweep sub-signal is transmitted through a shift register circuit disposed in the non-display region 12, a number of shift register units directly electrically connected to the first sweep signal lines 161 in the shift register circuit can be reduced. A number of components in the display apparatus 200 is reduced, so that the area of the non-display region 12 in the display apparatus 200 is reduced, thereby improving a screen-to-body ratio of the display apparatus 200.

Figure 11:
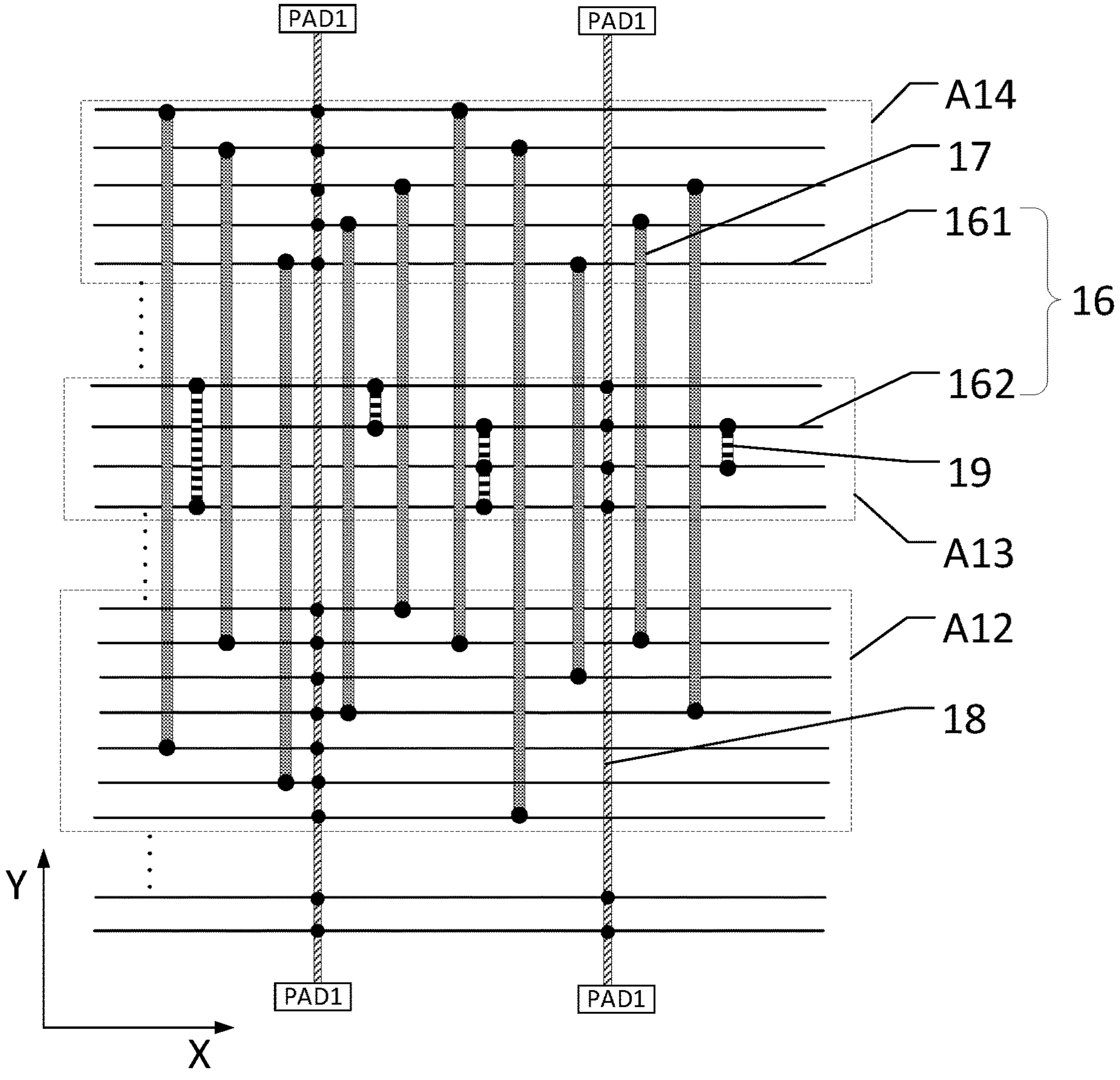
FIG. 11 is a schematic diagram of some components in a display apparatus according to another embodiment of the present disclosure.

FIG. 11 is a schematic diagram of some components in a display apparatus according to another embodiment of the present disclosure. Referring to FIG. 11 in combination with FIG. 2, in some embodiments of the present disclosure, the sweep signal lines 16 further include second sweep signal lines 162 extending in the first direction X. The sweep signal further includes a second sweep sub-signal.

In the second direction Y, a third display sub-region A13 is included between the first display sub-region A14 and the second display sub-region A12. The third display sub-region A13 includes m1 second sweep signal lines 162. m1 is a positive integer. The second sweep signal line 162 receives the second sweep sub-signal.

The present disclosure further provides an optional embodiment on the basis that the display panel 100 includes the first display sub-region A14 and the second display sub-region A12 spaced apart and the first connection line 17 is connected to one of the first sweep signal lines 161 in the first display sub-region A14 and one of the first sweep signal lines 161 in the second display sub-region A12. In addition to the first sweep signal lines 161, the sweep signal lines 16 in the display panel 100 may further include the second sweep signal lines 162. An extension direction of the second sweep signal line 162 is the same as that of the first sweep signal line 161. Further, the second sweep signal lines 162 may be disposed in the third display sub-region A13 between the first display sub-region A14 and the second display sub-region A12. The second sweep signal line 162 receives the second sweep sub-signal included in the sweep signal. The first sweep sub-signal and the second sweep sub-signal may have a same waveform or different waveforms as required, and may have a same start moment or different start moments as required. The type and time of the sweep signal received by each of the first sweep signal line 161 and the second sweep signal line 162 may be set as required and are not limited in the present disclosure, provided that a good display effect of the display apparatus 200 and display uniformity of the display apparatus 200 can be ensured.

It should be noted that the number of second sweep signal lines 162 in the third display sub-region A13 is not limited in the present disclosure. The number of second sweep signal lines 162 in the third display sub-region A13 can be selected as required.

Figure 12:
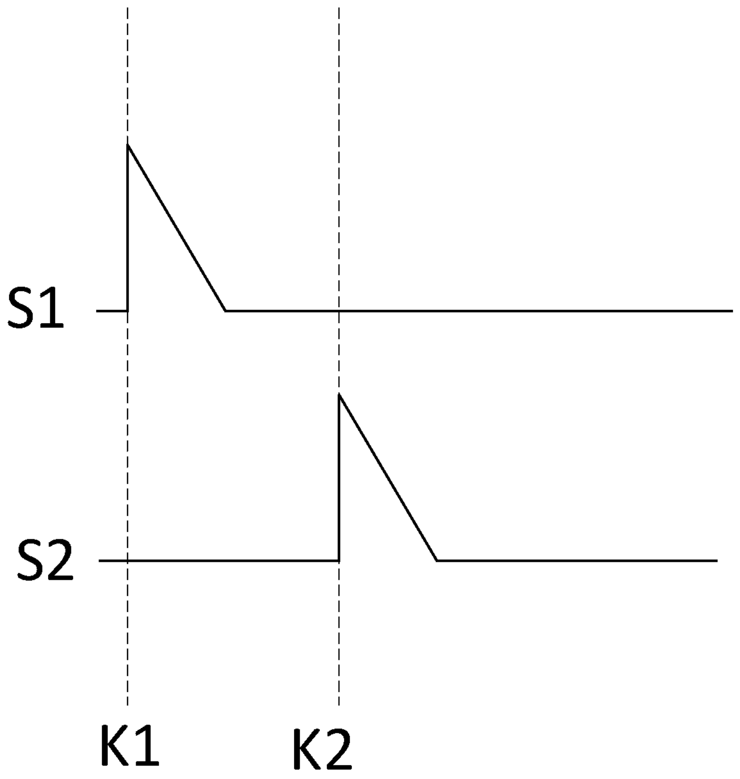
FIG. 12 is a sequence diagram of a first sweep sub-signal and a second sweep sub-signal according to an embodiment of the present disclosure.

FIG. 12 is a sequence diagram of a first sweep sub-signal and a second sweep sub-signal according to an embodiment of the present disclosure. Referring to FIG. 11 and FIG. 12 in combination with FIG. 2, in some embodiments of the present disclosure, the sweep signal lines 16 further include the second sweep signal lines 162 extending in the first direction X. At least two of the second sweep signal lines 162 are connected through a second connection line 19. The second connection line 19 extends in the second direction Y.

The sweep signal includes a first sweep sub-signal S1 and a second sweep sub-signal S2.

The first sweep signal line 161 receives the first sweep sub-signal S1 at a moment K1, and the second sweep signal line 162 receives the second sweep sub-signal S2, where K1≠K2.

The present disclosure further provides an optional embodiment in which the sweep signal lines 16 further include the second sweep signal lines 162 in addition to the first sweep signal lines 161 extending in the first direction X. The extension direction of the second sweep signal line 162 is the same as that of the first sweep signal line 161. On the basis that at least two of the first sweep signal lines 161 are connected through the first connection line 17, it may be further optionally set that at least two of the second sweep signal lines 162 are connected through the second connection line 19. An extension direction of the second connection line 19 is the same as that of the first connection line 17. On this basis, it may be further optionally set that the sweep signal received by the first sweep signal line 161 is the first sweep sub-signal S1, and the sweep signal received by the second sweep signal line 162 is the second sweep sub-signal S2. The start moment K1 at which the first sweep sub-signal S1 is transmitted to the first sweep signal line 161 is different from the start moment K2 at which the second sweep sub-signal S2 is transmitted to the second sweep signal line 162. With such configuration, when the first sweep signal line 161 receiving the first sweep sub-signal S1 and the second sweep signal line 162 receiving the second sweep sub-signal S2 are disposed in different regions, separate driving can be performed on the sweep signals in the two regions as required so that different sweep signals can be executed in a scanning period and a light-emitting period in one image scanning period. The time equivalent to one image scanning period can be used as the scanning period of the sweep signal. Such an arrangement can avoid increasing a transmission rate of an electrical signal to a component configured to provide the sweep signal in the non-display region 12, which can avoid increasing costs of a peripheral circuit and ensure the display effect of the display apparatus 200.

It should be noted that the first sweep sub-signal S1 and the second sweep sub-signal S2 are incomplete signals, and may be different in time and waveform.

It should also be noted that the present disclosure merely uses an example in which the display apparatus 200 includes the first sweep signal lines 161 and the second sweep signal lines 162, but the present disclosure is not limited thereto.

The display apparatus 200 may further optionally include a third sweep signal line, a fourth sweep signal line, a fifth sweep signal line, and/or the like as required. Similarly, the sweep signal may be set to further include a third sweep sub-signal, a fourth sweep sub-signal, a fifth sweep sub-signal, and/or the like.

It should also be noted that the first connection line 17 and the second connection line 19 both extend in the second direction Y. All first connection lines 17 and all second connection lines 19 may be optionally disposed in a same film layer as required. This can avoid increasing the thickness of the display apparatus 200 and achieve the design requirement of thinning the display apparatus 200. However, the present disclosure is not limited thereto. Alternatively, at least one of the first connection lines 17 and at least one of the second connection lines 19 may be disposed in different film layers as required.

Figure 13:
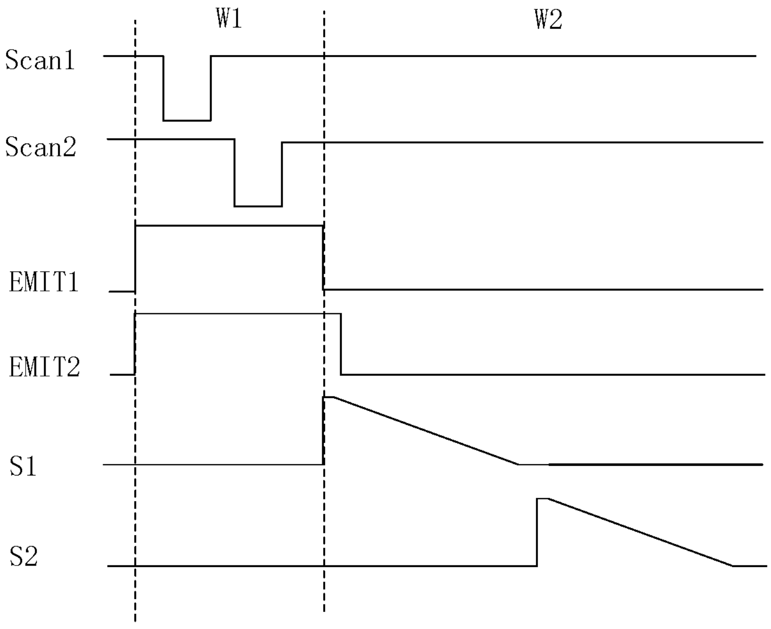
FIG. 13 is a schematic circuit diagram of a pixel circuit according to an embodiment of the present disclosure.
Figure 14:
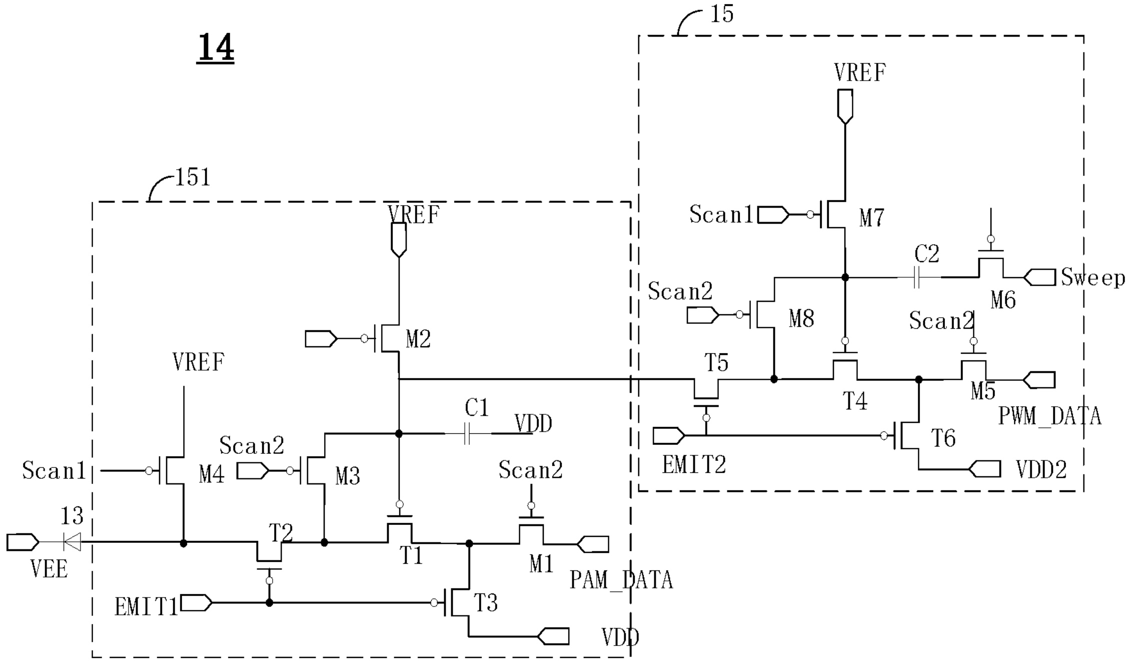
FIG. 14 is an operating sequence diagram of a pixel circuit according to an embodiment of the present disclosure.

FIG. 13 is a schematic circuit diagram of a pixel circuit according to an embodiment of the present disclosure. FIG. 14 is an operating sequence diagram of a pixel circuit according to an embodiment of the present disclosure. Referring to FIG. 11 to FIG. 14 in combination with FIG. 2, an operating principle of the pixel circuit 14 is described in detail with reference to the pixel circuit shown in FIG. 13 and the operating sequence diagram in FIG. 14.

Taking each transistor being a P-type transistor, the P-type transistor is turned on when a voltage difference between a gate and a source of the P-type transistor is smaller than a threshold voltage, which may also be understood as being turned on at a low level. Therefore, a pulse width control signal SWEEP can be set to linearly decrease (referring to FIG. 14). A control terminal of a second drive transistor T4 is connected to a first electrode plate of a second capacitor C2. When a pulse width control signal SWEEP is input to a second electrode plate of the second capacitor C2, a voltage of the control terminal of the second drive transistor T4 changes from an initial voltage with a same slope as a linear change slope of SWEEP until the voltage is lower than a threshold voltage of the second drive transistor T4 so that the second drive transistor T4 is turned on. A turn-off voltage VDD2 is transmitted to a control terminal of a first drive transistor T1 through the second drive transistor T4. A drive current stops being output to the light-emitting element 13 under the action of the turn-off voltage VDD2. It can be learned from the foregoing process that the light emission duration of the light-emitting element 13 is controlled by a first data signal PAM_DATA and the pulse width control signal SWEEP. The pixel circuit 14 further includes a fourth switching transistor T5 and a fifth switching transistor T6. Under control of a second light-emitting control signal EMIT2, the fourth switching transistor T5 and the fifth switching transistor T6 control whether the turn-off signal VDD2 is transmitted to the control terminal of the first drive transistor T1.

FIG. 14 shows that one frame period is composed of a scanning signal input phase W1 and a light-emitting phase W2.

In the scanning signal input phase W1, a first light-emitting control signal EMIT1 is at a high level.

A first scanning signal Scan1 is input with a low level signal. A first reset transistor M2 is turned on to transmit a reference voltage signal VREF to the control terminal of the first drive transistor T1. At this time, a voltage of the control terminal of the first drive transistor T1 is VREF. With such configuration, the control terminal of the first drive transistor T1 is reset. Simultaneously, the first scanning signal Scan1 also makes an initialization transistor M4 be turned on to transmit the reference voltage signal VREF to the light-emitting element 13 to reset the light-emitting element 13. The first scanning signal Scan1 is written into a second reset transistor M7. The second reset transistor M7 is turned on to transmit the reference voltage signal VREF to the control terminal of the second drive transistor T4. At this time, the voltage of the control terminal of the second drive transistor T4 is VREF. With such configuration, the control terminal of the second drive transistor T4 is reset.

After the first scanning signal Scan1 is enabled, a second scanning signal Scan2 is input with a low level signal. A first data writing transistor M1 is turned on to transmit the first data signal PAM_DATA to a source of the first drive transistor T1. At this time, a first compensation transistor M3 is synchronously turned on so that a drain and a gate of the first drive transistor T1 form a loop. The voltage of the control terminal of the first drive transistor becomes PAM_DATA+Vth. In FIG. 13, it is exemplarily set that control terminals of the first data writing transistor M1 and the first compensation transistor M3 both receive Scan2. In other words, the first data writing transistor M1 and the first compensation transistor M3 use the same scanning signal. In another embodiment, scanning signals of the first data writing transistor M1 and the first compensation transistor M3 may alternatively be set to be different, provided that effective levels of the scanning signals of the first data writing transistor M1 and the first compensation transistor M3 at least partially overlap. The second scanning signal Scan2 is written into a second data writing transistor M5. At this time, the second data writing transistor M5 is turned on to transmit a second data signal PWM DATA to a source of the second drive transistor T4. At this time, a second compensation transistor M8 is synchronously turned on so that a drain and a gate of the second drive transistor T4 form a loop, thereby compensating the voltage of the control terminal of the second drive transistor T4.

After the second scanning signal Scan2 is enabled, the pulse width control signal SWEEP linearly changes (for example, linearly decreases). The first light-emitting control signal EMIT1 is input with a low level signal. The first light-emitting control signal EMIT1 is input to a low level signal device. A first switching transistor T2 and a second switching transistor T3 are turned on. A drive current formed by the first drive transistor T1 based on the first data signal PAM_DATA and a first power signal terminal VDD flows to a second power signal terminal VEE through the light-emitting element 13 so that the light-emitting element 13 emits light. Turn-on duration of the first drive transistor T1 can be adjusted by adjusting the first data signal PAM_DATA, thereby controlling a current of the light-emitting element 13.

Simultaneously, the second light-emitting control signal EMIT2 is input with a low level signal. The second light-emitting control signal EMIT2 is input to a low level signal device. The fourth switching transistor T5 and the fifth switching transistor T6 are turned on. A PWM function is enabled. The turn-off voltage VDD2 is transmitted to the control terminal of the second drive transistor T4. The second drive transistor T4 provides the turn-off voltage VDD2 to the control terminal of the first drive transistor T1 based on a potential of the control terminal of the second drive transistor T4. The potential of the control terminal of the second drive transistor T4 also changes with the same slope as the linear change slope of the pulse width control signal SWEEP until the potential is lower than Vth. The second drive transistor T4 is turned on from a high resistance state so that the turn-off voltage VDD2 is provided to the control terminal of the first drive transistor T1. Under control of the turn-off voltage VDD2, the first drive transistor T1 is turned on from the high resistance state and stops outputting the drive current to the light-emitting element 13. Therefore, the turn-on duration of the first drive transistor T1 is controlled by a second data writing signal PWM DATA and the pulse width control signal SWEEP together, thereby controlling the light emission duration of the light-emitting element 13.

It should be noted that each transistor in the embodiments of the present disclosure may alternatively be set to an N-type transistor. Taking each transistor being an N-type transistor an example, the N-type transistor is turned on when a voltage difference between a gate and a source of the N-type transistor is greater than a threshold voltage, which may also be understood as being turned on at a high level. Therefore, a pulse width control signal SWEEP can be set to linearly increase. Similar to the operating principle in the foregoing embodiment, a transistor is reset through the first scanning signal Scan1. Multiple switching transistors are turned on under control of the second scanning signal Scan2. With such configuration, a drive transistor is turned on. The light emission duration and the drive current of the light-emitting element 13 are controlled under the action of the first light-emitting control signal EMIT1 and the second light-emitting control signal EMIT2.

It should also be noted that FIG. 13 and FIG. 14 merely use an example in which the pixel circuit 14 includes the pulse width control signal SWEEP. In combination with the first sweep sub-signal S1 and the second sweep sub-signal S2 included in the present disclosure, the pulse width control signal SWEEP in the pixel circuit 14 electrically connected to the first sweep signal line 161 is the first sweep sub-signal S1. The pulse width control signal SWEEP in the pixel circuit 14 electrically connected to the second sweep signal line 162 is the second sweep sub-signal S2.

Figure 15:
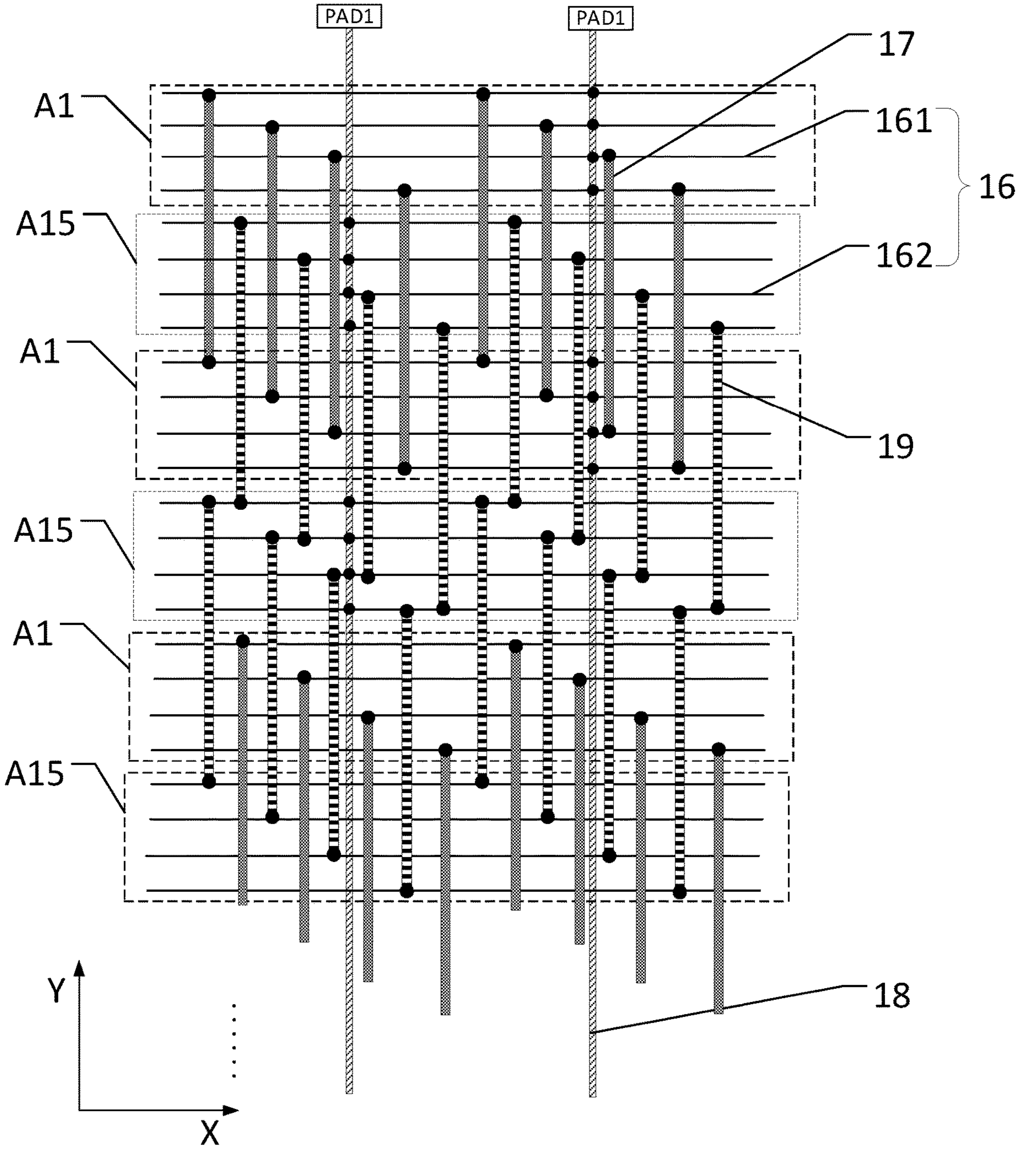
FIG. 15 is a schematic diagram of some components in a display apparatus according to another embodiment of the present disclosure.
Figure 16:
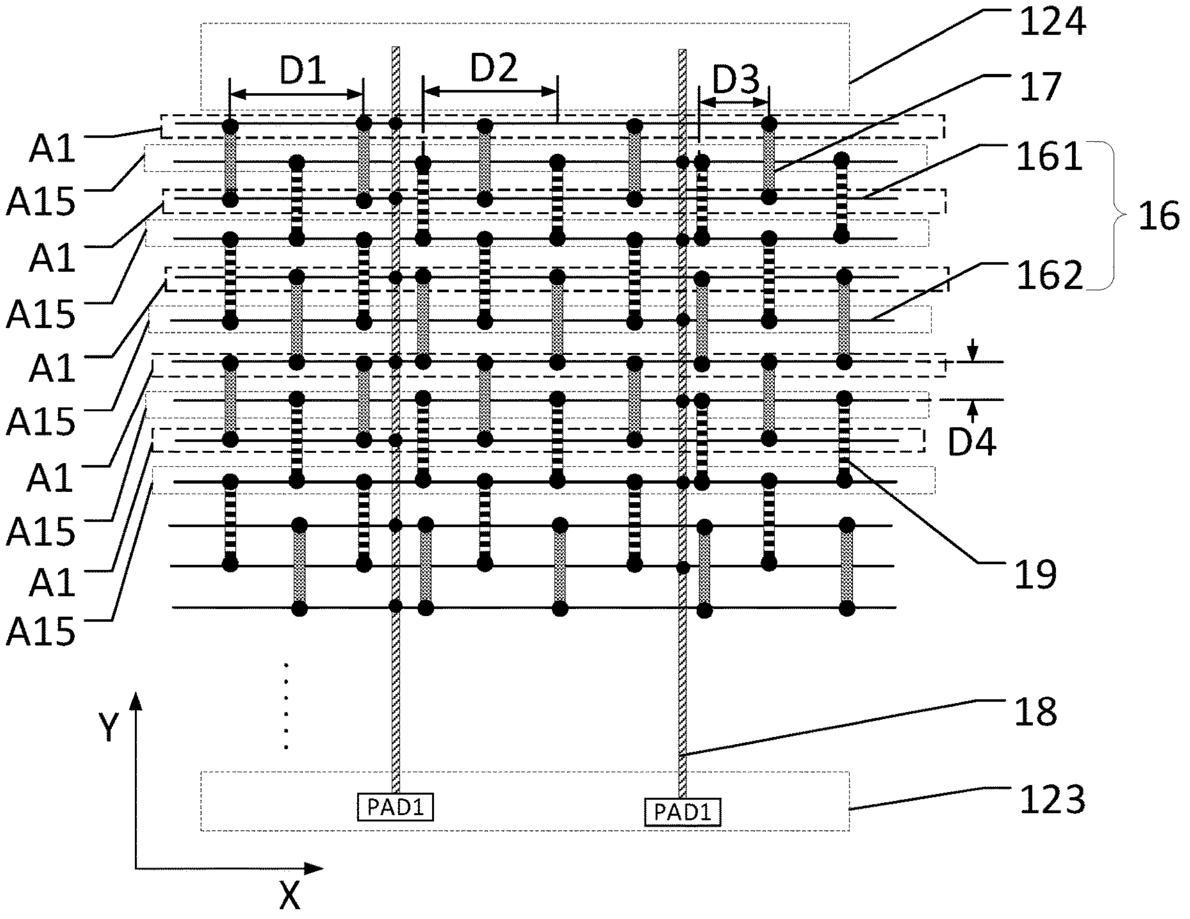
FIG. 16 is a schematic diagram of some components in a display apparatus according to another embodiment of the present disclosure.

FIG. 15 is a schematic diagram of some components in a display apparatus according to another embodiment of the present disclosure. FIG. 16 is a schematic diagram of some components in a display apparatus according to another embodiment of the present disclosure. Referring to FIG. 15 and FIG. 16 in combination with FIG. 2, in some embodiments of the present disclosure, the display panel 100 includes first display regions A1 and second display regions A15 alternately arranged in the second direction Y.

The first sweep signal lines 161 are located in the first display regions A1. The second sweep signal lines 162 are located in the second display regions A15.

In the first direction X, at least one second connection line 19 is included between adjacent two of the first connection lines 17; and/or In the second direction Y, at least one second connection line 19 is included between adjacent two of the first connection lines 17.

The present disclosure further provides an optional embodiment in which the display panel 100 includes the first display regions A1 and the second display regions A15 alternately arranged in the second direction Y. The sweep signal lines 16 disposed in the first display regions A1 are all first sweep signal lines 161. The sweep signal lines 16 disposed in the second display regions A15 are all second sweep signal lines 162. The first connection line 17 may be disposed to be electrically connected to at least two of the first sweep signal lines 161. The first sweep signal lines 161 to which the first connection line 17 is electrically connected may be selectively disposed in two different first display regions A1. The second connection line 19 may be disposed to be electrically connected to at least two of the second sweep signal lines 162. The second sweep signal lines 162 to which the second connection line 19 is electrically connected may be selectively disposed in two different second display regions A15. On this basis, it may be further set that at least one second connection line 19 is disposed between adjacent two of the first connection lines 17 in the first direction X; at least one second connection line 19 is disposed between adjacent two of the first connection lines 17 in the second direction Y; or at least one second connection line 19 is disposed between adjacent two of the first connection lines 17 in the first direction X, and at least one second connection line 19 is disposed between adjacent two of the first connection lines 17 in the second direction Y. As shown in FIG. 16, an optional embodiment is provided. The first connection lines 17 and the second connection lines 19 are alternately arranged in the first direction X; and/or the first connection lines 17 and the second connection lines 19 are alternately arranged in the second direction Y. This can prevent excessive first connection lines 17 and excessive second connection lines 19 from being gathered in one display region so that an excessively large load difference between the regions in the first direction X can be prevented. With such configuration, a load difference between the electrical signals received by the light-emitting elements 13 can be reduced as much as possible so that light-emitting effects of the light-emitting elements 13 can be more uniform, thereby improving the display effect of the display apparatus 200.

It should be noted that a number of first sweep signal lines 161 disposed in each first display region A1 can be selected as required. A number of second sweep signal lines 162 disposed in each second display region A15 can be selected as required, which is not limited in the present disclosure.

Referring to FIG. 16 in combination with FIG. 2, for example, when the first connection lines 17 and the second connection lines 19 are alternately arranged in the first direction X, the present disclosure provides an optional embodiment in which in the first direction X, a distance between the adjacent two of the first connection lines 17 is defined as D1, and a distance between the two adjacent second connection lines 19 is defined as D2. D1=D2. With such configuration, connection nodes of the first sweep signal lines 161 and the first connection lines 17 can be arranged as regularly as possible in the display region 11, and connection nodes of the second sweep signal lines 162 and the second connection lines 19 can be arranged as regularly as possible in the display region 11 so that the nodes electrically connected to the sweep signal lines 16 and included in the display region 11 are arranged more uniformly. This makes magnitudes of the sweep signals received by the light-emitting elements 13 in each region more uniform so that the display effect of the display apparatus 200 is more uniform.

It should be noted that in the first direction X, that the distance D1 between the adjacent two of the first connection lines 17 is set to be equal to the distance D2 between the two adjacent second connection lines 19 is merely an optional embodiment provided by the present disclosure. The present disclosure is not limited thereto. In some embodiments of the present disclosure, in the first direction X, the distance D1 between the adjacent two of the first connection lines 17 and the distance D2 between the two adjacent second connection lines 19 may alternatively be set to be different. In addition, on the basis that the distance D1 between the adjacent two of the first connection lines 17 is set to be equal to the distance D2 between the two adjacent second connection lines 19 in the first direction X, it may be further set that a distance D3 between the first connection line 17 and the second connection line 19 adjacent to each other in the first direction X is set to be equal to half of the distance D1 between the adjacent two of the first connection lines 17. Similarly, at least two of a distance between center points of the adjacent two of the first connection lines 17, a distance between center points of the two adjacent second connection lines 19, and a distance between center points of the adjacent first connection line 17 and second connection line 19 in the second direction Y can be set to be equal or unequal as required.

Further, referring to FIG. 16 in combination with FIG. 2, in the first direction X, the distance D3 between at least one group of the first connection line 17 and the second connection line 19 that are adjacent may be selectively set to be greater than 0. In the second direction Y, a distance D4 between at least one group of the first connection line 17 and the second connection line 19 that are adjacent may be selectively set to be greater than 0. With such configuration, the first connection lines 17 and the second connection lines 19 can be disposed in the same film layer in a display module. Crosstalk between electrical signals can be avoided. An increase in a number of film layers due to the arrangement of different film layers can be avoided, thereby achieving the design requirement of thinning the display apparatus 200.

Referring to FIG. 16 in combination with FIG. 2, when the pin bonding pad PAD1 for transmitting the sweep signal to the auxiliary line 18 is located in a first non-display region 121 in the second direction Y, the first display regions A1 and the second display regions A15 are alternately arranged in a direction from a second non-display region 122 to the first non-display region 121. At this time, in each group of the first display region A1 and the second display region A15 alternately arranged in the direction from the second non-display region 122 to the first non-display region 121, a distance between the first display region A1 and the pin bonding pad PAD1 is greater than a distance between the second display region A15 and the pin bonding pad PAD1. Consequently, the load of the first sweep signal line 161 disposed in the first display region A1 is greater than the load of the second sweep signal line 162 disposed in the second display region A15. In this case, an optional arrangement manner is provided, in which the number of first connection lines 17 is greater than the number of second connection lines 19. With such configuration, a larger number of nodes electrically connected to the first sweep signal lines 161 in the first display region A1 are disposed to further reduce the load of the first sweep signal lines 161 compared with the second display region A15 in the same group. This makes the magnitudes of the sweep signals received by the light-emitting elements 13 in the first display region A1 and the second display region A15 more uniform so that the display effect of the display apparatus 200 is more uniform. In addition, an optional arrangement manner is further provided, in which a length of at least one of the first connection lines 17 is greater than a length of at least one of the second connection lines 19. The first connection line 17 with the larger length is configured to further increase the number of nodes electrically connected to the first sweep signal lines 161 in the second direction Y, thereby further reducing the load of the first sweep signal lines 161 compared with the second display region A15. This makes the magnitudes of the sweep signals received by the light-emitting elements 13 in each region more uniform so that the display effect of the display apparatus 200 is more uniform.

Referring to FIG. 12 in combination with FIG. 2, in some embodiments of the present disclosure, the first sweep sub-signal S1 and the second sweep sub-signal S2 have a same electrical signal waveform.

Different sweep signals may be transmitted through different electrically connected shift register circuits. When the display apparatus 200 includes at least the first sweep sub-signal S1 and the second sweep sub-signal S2, the first sweep sub-signal S1 and the second sweep sub-signal S2 may be generated at different time so that the electrically connected light-emitting elements 13 can be controlled to emit light at different time. However, this does not mean that the electrical signal waveforms of the first sweep sub-signal S1 and the second sweep sub-signal S2 need to be set to be different. The electrical signal waveforms of the first sweep sub-signal S1 and the second sweep sub-signal S2 may be set to be the same as required.

The sweep signal may have a linearly changing signal waveform such as a triangular wave for linearly changing a voltage of a gate of a drive transistor by an externally applied voltage. A sweep signal providing circuit such as the pin bonding pad PAD1 or a signal input pin may be configured to be mounted in an external printed circuit board (PCB) together with a processor or a timing controller (TCON) in the display apparatus 200. A gate driver may be configured to be included in an array substrate of the display panel 100.

Figure 17:
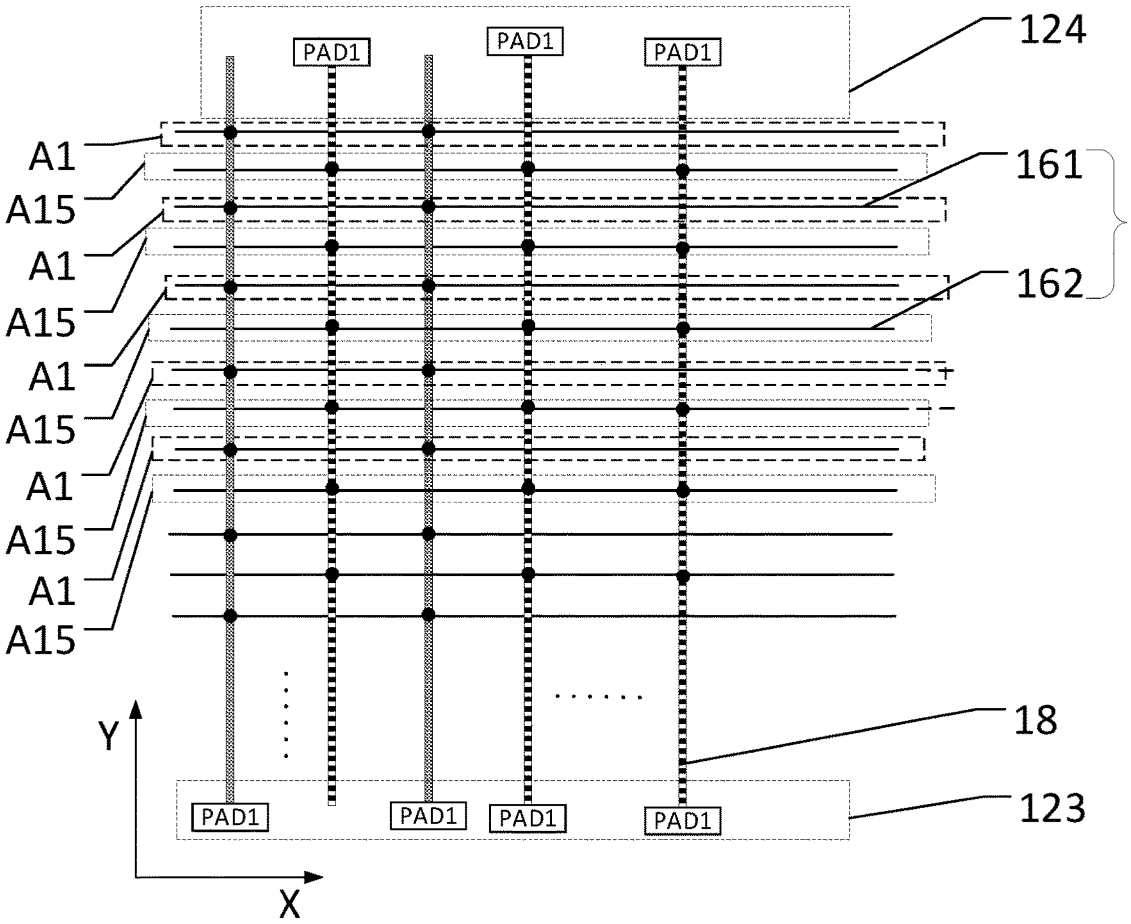
FIG. 17 is a schematic diagram of some components in a display apparatus according to another embodiment of the present disclosure.

FIG. 17 is a schematic diagram of some components in a display apparatus according to another embodiment of the present disclosure. Referring to FIG. 17 in combination with FIG. 2, in some embodiments of the present disclosure, the first connection line 17 is connected to all of the first sweep signal lines 161, and the second connection line 19 is connected to all of the second sweep signal lines 162.

The present disclosure further provides an optional embodiment in which at least one first connection line 17 may be disposed to be electrically connected to all first sweep signal lines 161 in the display apparatus 200, and at least one second connection line 19 may be disposed to be electrically connected to all second sweep signal lines 162 in the display apparatus 200. In this case, it may be further set that the display apparatus 200 further includes a pin bonding pad PAD1. The pin bonding pad PAD1 provides the sweep signal to the PWM module 15. The first sweep signal line 161 is connected to at least one corresponding pin bonding pad PAD1, and/or the second sweep signal line 162 is connected to at least one corresponding pin bonding pad PAD1. In some embodiments of the present disclosure, one side of the first connection line 17 electrically connected to all first sweep signal lines 161 may be selectively set to be electrically connected to the pin bonding pad PAD1, or each side thereof may be electrically connected to the pin bonding pad PAD1; and/or one side of the second connection line 19 electrically connected to all second sweep signal lines 162 may be selectively set to be electrically connected to the pin bonding pad PAD1, or each side thereof may be electrically connected to the pin bonding pad PAD1. The pin bonding pad PAD1 may be configured to transmit the corresponding sweep signal to the first connection line 17 or the second connection line 19 electrically connected thereto, and then to the sweep signal line 16 electrically connected to the first connection line 17 or the second connection line 19, thereby controlling the light emission duration of the light-emitting element 13.

The present disclosure provides an optional arrangement manner in which the first connection lines 17 and the second connection lines 19 are alternately arranged in the first direction X. The distance between the adjacent two of the first connection lines 17 is the same as the distance between the two adjacent second connection lines 19. Each of the first connection lines 17 and the second connection lines 19 is electrically connected to at least one pin bonding pad PAD1. With such configuration, the nodes at which the first connection lines 17 and the second connection lines 19 are electrically connected to the sweep signal lines 16 can be uniformly arranged in the display apparatus 200, and the load difference between different positions of the sweep signal lines 16 can be reduced, thereby weakening the display difference between the light-emitting elements 13 in different regions, and improving the display effect of the display apparatus 200.

Figure 18:
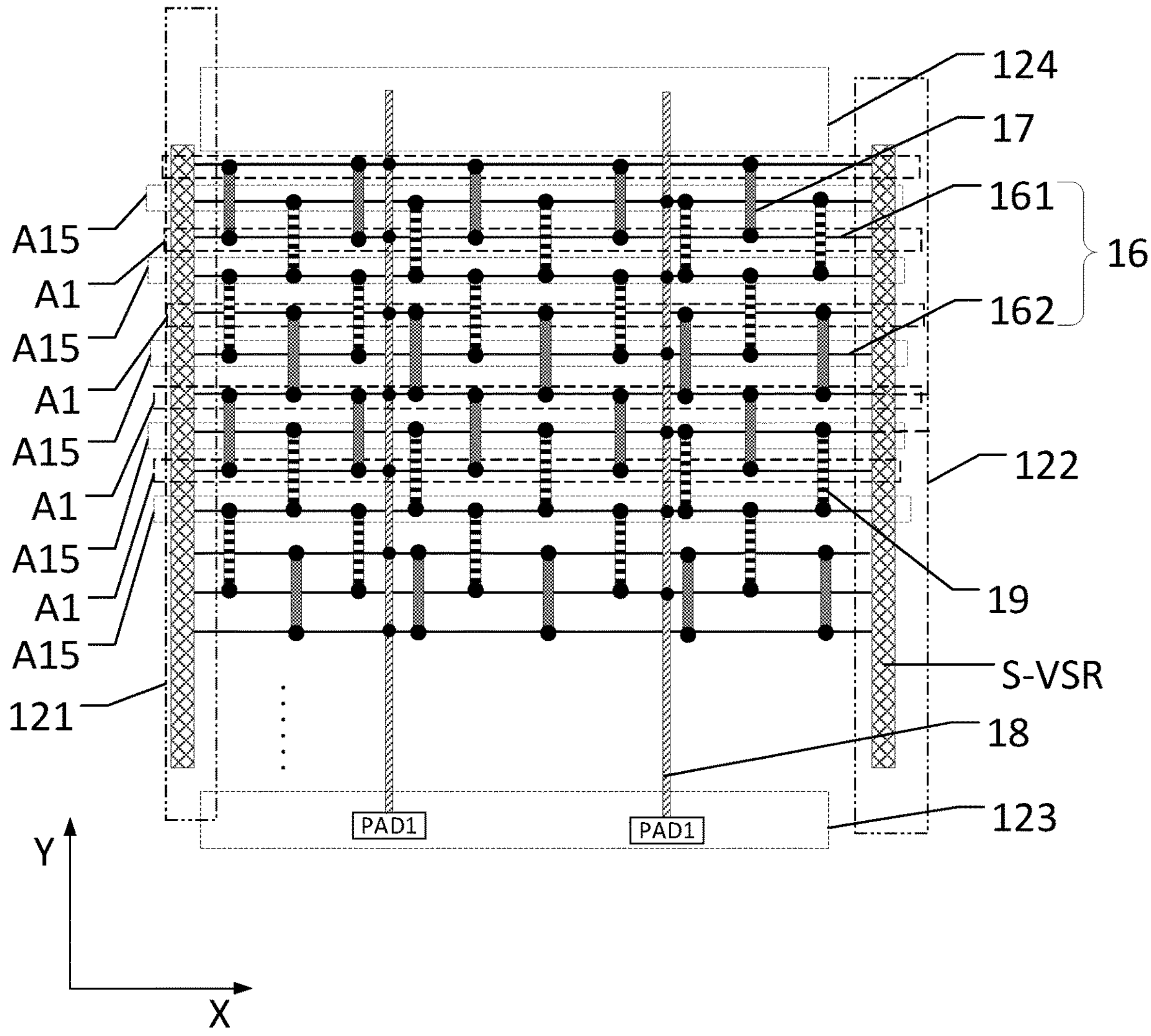
FIG. 18 is a schematic diagram of some components in a display apparatus according to another embodiment of the present disclosure.
Figure 19:
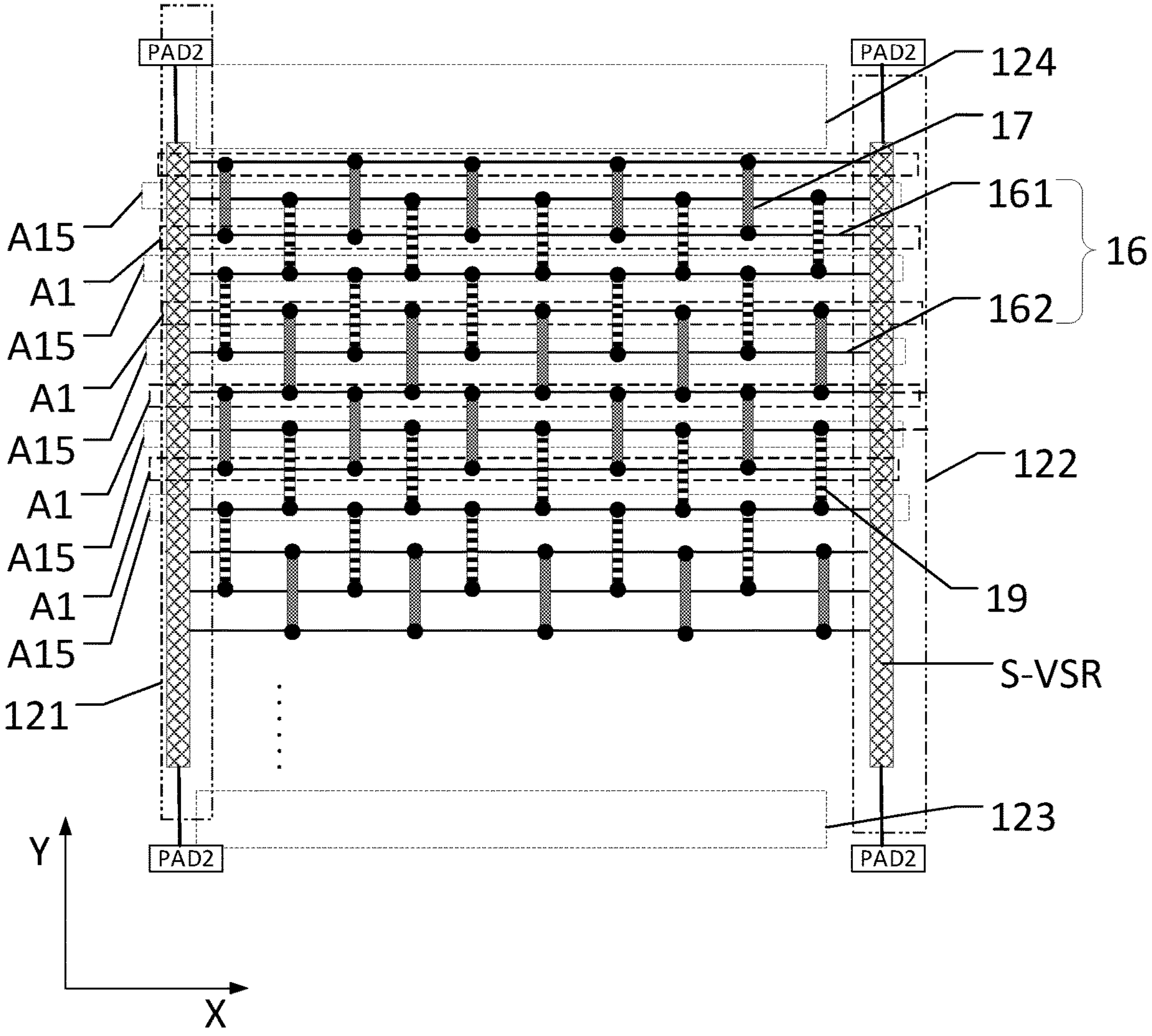
FIG. 19 is a schematic diagram of some components in a display apparatus according to another embodiment of the present disclosure.

FIG. 18 is a schematic diagram of some components in a display apparatus according to another embodiment of the present disclosure. FIG. 19 is a schematic diagram of some components in a display apparatus according to another embodiment of the present disclosure. Referring to FIG. 18 and FIG. 19 in combination with FIG. 2, in some embodiments of the present disclosure, the display panel 100 includes a display region 11 and a non-display region 12 at least partially surrounding the display region 11. The non-display region 12 includes a first non-display region 121 and a second non-display region 122 located at both sides of an extension direction of the first sweep signal line 161. The display panel 100 further includes a sweep shift register circuit S-VSR located in the first non-display region 121 and/or the second non-display region 122. The sweep shift register circuit S-VSR includes multiple cascaded shift register units (not shown). At least one of the shift register units is electrically connected to at least one of the first sweep signal lines 161.

The shift register unit is configured to transmit the required sweep signal to the first sweep signal line 161 electrically connected thereto so that the light-emitting element 13 electrically connected to each of the first sweep signal lines 161 can receive the sweep signal, thereby controlling the light emission duration of the light-emitting element 13.

It should be noted that the present disclosure does not limit that the sweep shift register circuit S-VSR is disposed only in the first non-display region 121 or disposed only in the second non-display region 122. The shift register circuit may be disposed in each of the first non-display region 121 and the second non-display region 122 as required.

As shown in FIG. 19, on the basis that the sweep shift register circuit S-VSR is located in the first non-display region 121 and/or the second non-display region 122, a signal input pin bonding pad2 is further included in the first non-display region 121 and/or the second non-display region 122 of the display apparatus 200. The signal input pin bonding pad2 is located at at least one side of the sweep shift register circuit S-VSR in the second direction Y and is electrically connected to the sweep shift register circuit S-VSR. The signal input pin bonding pad2 provides the sweep signal to the shift register unit.

The signal input pin bonding pad2 provides the sweep signal to the shift register unit electrically connected thereto. The sweep signal is transmitted to the sweep signal line 16 electrically connected to each shift register unit through multiple cascaded shift register units. Then, an electrical signal is transmitted to the PWM module 15 of the pixel circuit 14 electrically connected to the sweep signal line 16, thereby controlling the light emission duration of the light-emitting element 13 electrically connected to the pixel circuit 14.

Multiple groups of different sweep signals are generated by the sweep shift register circuit S-VSR. Input signals of the sweep shift register circuit S-VSR may be input by signal input pins PAD2 at upper and lower ends thereof. At least one of the signals may be selected to be simultaneously input by the signal input pins PAD2 at the upper and lower ends as required.

It should be noted that different sweep signals can control different light-emitting elements 13 to emit light at different time. Therefore, in some embodiments of the present disclosure, multiple signal input pins PAD2 and/or multiple pin bonding pads PAD1 may be disposed in the display apparatus 200. The display apparatus 200 includes multiple signal input pins PAD2 and/or multiple pin bonding pads PAD1. In comparison with only one signal input pin bonding pad2 or one pin bonding pad PAD1, this can avoid that all light-emitting elements 13 simultaneously emit light through only one sweep signal output by one signal input pin bonding pad2 or one pin bonding pad PAD1, thereby achieving diversified display requirements for the display apparatus 200.

Figure 20:
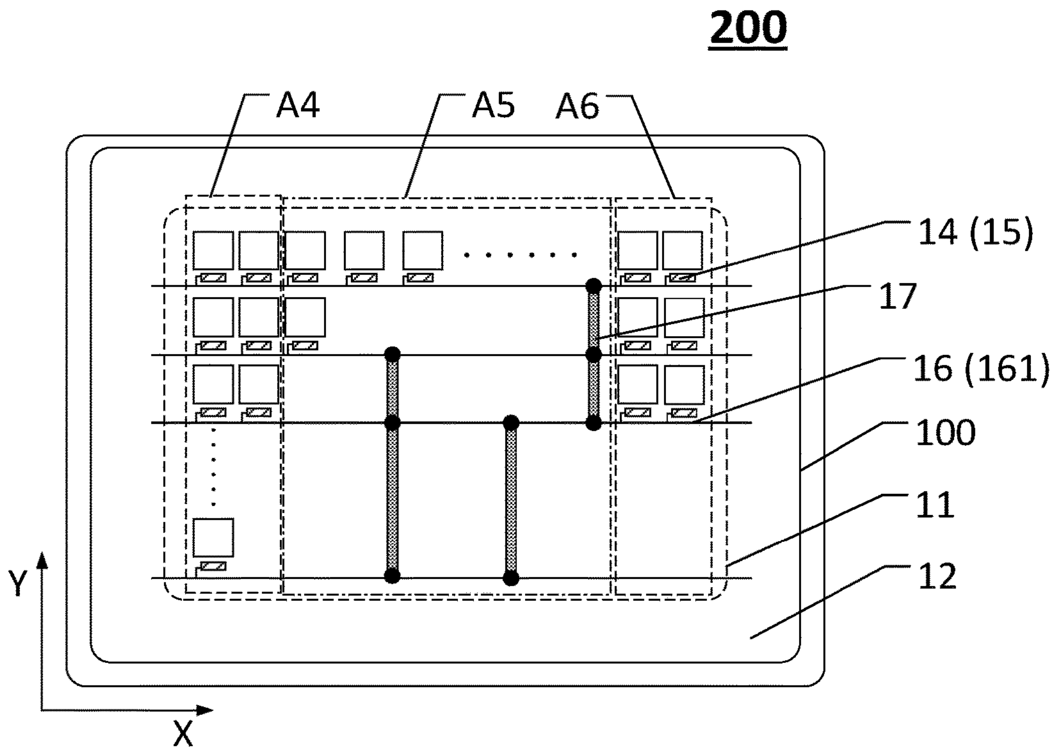
FIG. 20 is a schematic diagram of a display apparatus according to another embodiment of the present disclosure.

FIG. 20 is a schematic diagram of a display apparatus according to another embodiment of the present disclosure. Referring to FIG. 20, in some embodiments of the present disclosure, the display apparatus includes a display region 11. The display region 11 includes a fourth display region A4, a fifth display region A5, and a sixth display region A6 that are arranged in the first direction X. The fourth display region A4 and the sixth display region A6 are located at both sides of the fifth display region A5.

An arrangement density of the light-emitting elements 13 in the fourth display region A4 is defined as $\rho1$. An arrangement density of the light-emitting elements 13 in the fifth display region A5 is defined as $\rho2$. An arrangement density of the light-emitting elements 13 in the sixth display region A6 is defined as $\rho3$, where $\rho1>\rho2$, and $\rho3>\rho2$.

The first connection line 17 is located in the fifth display region A5.

The display module may include the fourth display region A4, the fifth display region A5, and the sixth display region A6 that are arranged in the first direction X. When the arrangement density of the light-emitting elements 13 in each of the fourth display region A4 and the fifth display region A6 is greater than the arrangement density of the light-emitting elements 13 in the fifth display region A5, it is difficult for the fourth display region A4 and the fifth display region A6 to have a vacant position for disposing the first connection line 17. In this case, the first connection line 17 may be disposed in the fifth display region A5, thereby avoiding interference of the first connection line 17 to an original component in the display apparatus 200 and achieving a good display effect of the display apparatus 200.

It should be noted that the arrangement density of the light-emitting elements 13 in each of the fourth display region A4 and the sixth display region A6 is high. This can leave enough space for the non-display region 12 in which the shift register circuit is disposed for the display apparatus 200.

Figure 21:
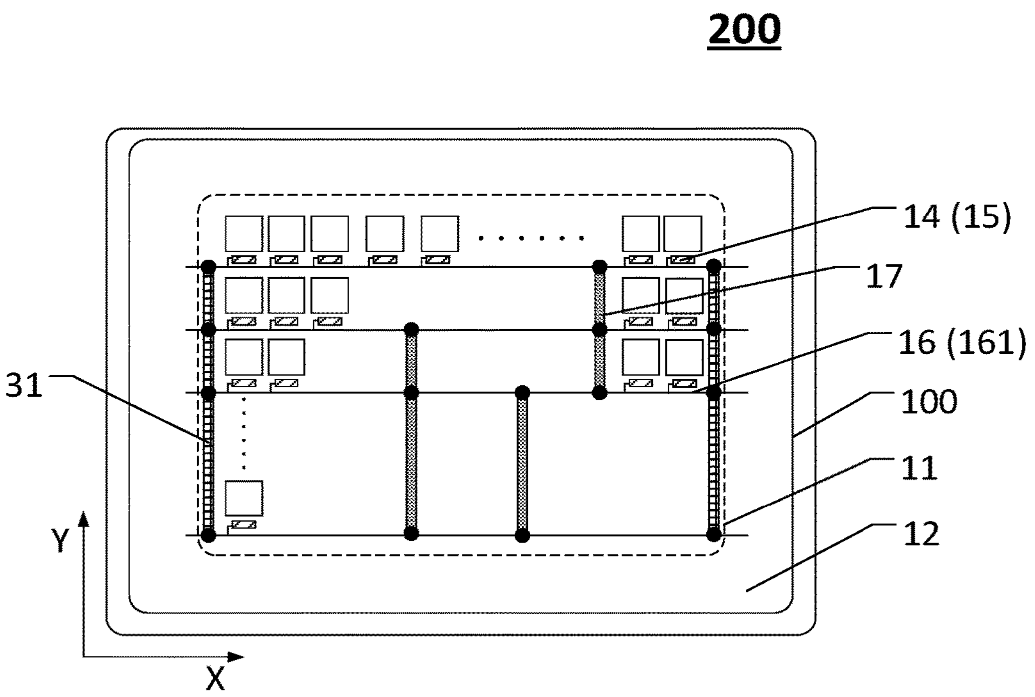
FIG. 21 is a schematic diagram of a display apparatus according to another embodiment of the present disclosure.

FIG. 21 is a schematic diagram of a display apparatus according to another embodiment of the present disclosure. Referring to FIG. 21, in some embodiments of the present disclosure, the display panel 100 includes a display region 11 and a non-display region 12 at least partially surrounding the display region 11.

The display apparatus 200 further includes at least one third connection line 31 extending in the second direction Y. The third connection line 31 is connected to all of the first sweep signal lines 161.

The third connection line 31 is located at a side of the first sweep signal line 161 facing the non-display region 12.

On the basis that the display apparatus 200 is provided with the first connection line 17 electrically connected to the first sweep signal lines 161, at least one third connection line 31 electrically connected to the first sweep signal lines 161 may be further disposed. An extension direction of the third connection line 31 is the same as that of the first connection line 17. In the first direction X, the third connection line 31 may be disposed at the side of the first sweep signal line 161 facing the non-display region 12 so that the third connection line 31 can be electrically connected to all of the first sweep signal lines 161 in the display apparatus 200. The third connection line 31 can further increase the number of nodes electrically connected to the first sweep signal lines 161, thereby further reducing the load of the first sweep signal lines 161. This makes the magnitudes of the sweep signals received by the light-emitting elements 13 in each region more uniform so that the display effect of the display apparatus 200 is more uniform.

The display apparatus provided in the present disclosure may be any product or component with a display function, such as a mobile phone, a tablet computer, a television, a display screen, a notebook computer, an in-vehicle display, or a navigator.

The display apparatus provided in the present disclosure achieves at least the following beneficial effects.

The present disclosure provides the display apparatus. The display apparatus is provided with the sweep signal lines for providing the sweep signal to the PWM module of the pixel circuit. It is further set that the sweep signal lines include the first sweep signal lines extending in the first direction. At least two of the first sweep signal lines are connected through the first connection line extending in the second direction. With such configuration, the corresponding first connection line is electrically connected to multiple first sweep signal lines in the display apparatus. The number and positions of the first connection lines and the numbers of first sweep signal lines to which the first connection lines are electrically connected are adjusted to increase the number of nodes at which the first connection lines are electrically connected to the first sweep signal lines in the display region, reduce the load of the electrical signal received by the light-emitting element at the side away from the nodes at which the first connection lines are electrically connected to the first sweep signal lines, weaken the display difference between the light-emitting element at the side away from the nodes at which the first connection lines are electrically connected to the first sweep signal lines and the light-emitting element at the side close to the nodes at which the first connection lines are electrically connected to the first sweep signal lines, and improve the display effect of the display apparatus.

Although some embodiments of the present disclosure have been explained in detail through examples, those skilled in the art should understand that the above examples are only for illustration and not intended to limit the scope of the present disclosure. Those skilled in the art should understand that modifications can be made to the aforementioned embodiments without departing from the scope and spirit of the present disclosure. The scope of the present disclosure is defined by the appended claims.

What is claimed is:

1. A display apparatus comprising:

a display panel comprising:

light-emitting elements; and pixel circuits; wherein at least one of the pixel circuits comprises a pulse width modulation module configured to control light emission duration of the light-emitting element; and sweep signal lines configured to provide a sweep signal to the pulse width modulation module;

wherein the sweep signal lines comprise first sweep signal lines extending in a first direction, and at least two of the first sweep signal lines are connected through a first connection line extending in a second direction that intersects the first direction;

wherein the sweep signal lines further comprise second sweep signal lines extending in the first direction, and at least two of the second sweep signal lines are connected through a second connection line, the second connection line extends in the second direction;

wherein the sweep signal comprises a first sweep sub-signal and a second sweep sub-signal;

wherein the first sweep signal lines receive the first sweep sub-signal at a moment K1, and the second sweep signal lines receive the second sweep sub-signal at a moment K2; and wherein K1≠K2;

wherein the display panel comprises first display regions and second display regions alternately arranged in the second direction;

wherein the first sweep signal lines are located in the first display regions, and the second sweep signal lines are located in the second display regions; and wherein, in the first direction, at least one second connection line is disposed between adjacent two of the first connection lines; and/or wherein, in the second direction, at least one second connection line is disposed between adjacent two of the first connection lines.

2. The display apparatus according to claim 1, wherein, in the second direction, an extension length of one of the auxiliary lines is greater than an extension length of the first connection line.

3. The display apparatus according to claim 1, further comprising a pin bonding pad configured to provide the sweep signal to the pulse width modulation module, wherein the auxiliary lines are connected to the pin bonding pad.

4. The display apparatus according to claim 1, wherein, in the first direction, at least one first connection line is disposed between adjacent two of the auxiliary lines, or/and at least one of the auxiliary lines is disposed between adjacent two of the first connection lines.

5. The display apparatus according to claim 1, wherein the display panel further comprises a first display region, the first display region comprises n1 first sweep signal lines, where n1≥2, and n1 is a positive integer; and the first connection line is connected to the $a11^{th}$ first sweep signal line and the $a12^{th}$ first sweep signal line, and a12−a11≥2.

6. The display apparatus according to claim 1, wherein the display panel comprises a first display sub-region and a second display sub-region spaced apart in the second direction, the first display sub-region comprises n1 first sweep signal lines, the second display sub-region comprises n2 first sweep signal lines, and n1 and n2 are both positive integers; and wherein the first connection line is connected to one of the first sweep signal lines in the first display sub-region and one of the first sweep signal lines in the second display sub-region.

7. The display apparatus according to claim 6, wherein $n1 \geq 2$, $n2 \geq 2$, and $n1 = n2$; and wherein the first connection line is connected to the $i^{th}$ first sweep signal line in the first display sub-region and the $i^{th}$ first sweep signal line in the second display sub-region, $i \leq n1$, and i is a positive integer; or wherein the first connection line is connected to the $i1^{th}$ first sweep signal line in the first display sub-region and the $i2^{th}$ first sweep signal line in the second display sub-region, $i1 \leq n1$, $i2 \leq n2$, and i1 and i2 are both positive integers.

8. The display apparatus according to claim 6, wherein $n1 \geq 2$, $n2 \geq 2$, and $n1 = n2$; and wherein the first connection line is connected to the $(1+b)^{th}$ first sweep signal line in the first display sub-region and the $(n2-b)^{th}$ first sweep signal line in the second display sub-region, $b < n2$, $b \geq 0$, and b is an integer.

9. The display apparatus according to claim 6, wherein the sweep signal comprises a first sweep sub-signal;

wherein the first sweep signal line in the first display sub-region receives the first sweep sub-signal;

wherein the sweep signal lines further comprise second sweep signal lines extending in the first direction, and the sweep signal further comprises a second sweep sub-signal; and wherein, in the second direction, a third display sub-region is disposed between the first display sub-region and the second display sub-region, the third display sub-region comprises m1 second sweep signal lines, and m1 is a positive integer; and the second sweep signal line receives the second sweep sub-signal.

10. The display apparatus according to claim 1, wherein in the first direction, a distance between the adjacent two of the first connection lines is defined as D1, and a distance between two adjacent second connection lines is defined as D2; and D1=D2.

11. The display apparatus according to claim 1, wherein a number of the first connection lines is greater than a number of second connection lines; or wherein a length of at least one of the first connection lines is greater than a length of at least one of the second connection lines.

12. The display apparatus according to claim 1, wherein the first connection lines and the second connection lines are alternately arranged in the first direction; and/or wherein the first connection lines and the second connection lines are alternately arranged in the second direction.

13. The display apparatus according to claim 1, wherein, in the first direction, a distance between at least one group of the first connection line and the second connection line that are adjacent is defined as D3, and D3>0; and wherein, in the second direction, a distance between at least one group of the first connection line and the second connection line that are adjacent is defined as D4, and D4>0.

14. The display apparatus according to claim 1, further comprising a pin bonding pad configured to provide the sweep signal to the pulse width modulation module, wherein the first sweep signal line is connected to at least one corresponding pin bonding pad, or/and the second sweep signal line is connected to at least one corresponding pin bonding pad.

15. The display apparatus according to claim 1, wherein the display panel comprises a display region and a non-display region at least partially surrounding the display region, the non-display region comprises a first non-display region and a second non-display region located at both sides of an extension direction of the first sweep signal line;

wherein the display panel further comprises a sweep shift register circuit located in the first non-display region and/or the second non-display region; and wherein the sweep shift register circuit comprises cascaded shift register units, and at least one of the shift register units is electrically connected to at least one of the first sweep signal lines.

16. The display apparatus according to claim 15, further comprising a signal input pin, wherein the signal input pin is located at at least one side of the sweep shift register circuit in the second direction and is electrically connected to the sweep shift register circuit; and wherein the signal input pin is configured to provide the sweep signal to the shift register unit.

17. The display apparatus according to claim 1, further comprising: a display region, wherein the display region comprises a fourth display region, a fifth display region, and a sixth display region that are arranged in the first direction, and the fourth display region and the sixth display region are located at both sides of the fifth display region;

wherein an arrangement density of the light-emitting elements in the fourth display region is defined as $\rho 1$, an arrangement density of the light-emitting elements in the fifth display region is defined as $\rho 2$, an arrangement density of the light-emitting elements in the sixth display region is defined as $\rho 3$, where $\rho 1 > \rho 2$, and $\rho 3 > \rho 2$; and wherein the first connection line is located in the fifth display region.

18. The display apparatus according to claim 1, wherein the display panel comprises a first display region, the first display region comprises n1 first sweep signal lines, $n1 \geq 2$, and n1 is a positive integer; and the first connection line is connected to the $1^{st}$ first sweep signal line and the $n1^{th}$ first sweep signal line.

19. The display apparatus according to claim 1, wherein the display panel further comprises auxiliary lines extending in the second direction and connected to at least two of the first sweep signal lines; and wherein the first connection line is connected to M first sweep signal lines, one of the auxiliary lines is connected to N first sweep signal lines, $N \geq 2$, $N > M$, and M and N are both positive integers.

20. A display apparatus comprising:

a display panel comprising:

light-emitting elements; and pixel circuits; wherein at least one of the pixel circuits comprises a pulse width modulation module configured to control light emission duration of the light-emitting element; and sweep signal lines configured to provide a sweep signal to the pulse width modulation module;

wherein the sweep signal lines comprise first sweep signal lines extending in a first direction, and at least two of the first sweep signal lines are connected through a first connection line extending in a second direction that intersects the first direction;

wherein the display apparatus further comprises: a display region, wherein the display region comprises a fourth display region, a fifth display region, and a sixth display region that are arranged in the first direction, and the fourth display region and the sixth display region are located at both sides of the fifth display region;

wherein an arrangement density of the light-emitting elements in the fourth display region is defined as $\rho 1$, an arrangement density of the light-emitting elements in the fifth display region is defined as $\rho 2$, an arrangement density of the light-emitting elements in the sixth display region is defined as $\rho 3$, where $\rho 1>\rho 2$, and $\rho 3>\rho 2$; and wherein the first connection line is located in the fifth display region.

* * * * *